US011881105B2

(12) United States Patent
Troia et al.

(10) Patent No.: US 11,881,105 B2
(45) **Date of Patent: *Jan. 23, 2024**

(54) LANE DEPARTURE APPARATUS, SYSTEM AND METHOD

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,307

(22) Filed: May 23, 2022

(65) Prior Publication Data

US 2023/0230478 A1 Jul. 20, 2023

Related U.S. Application Data

(63) Continuation of application No. 16/624,580, filed as application No. PCT/IB2018/001408 on Dec. 7, 2018, now Pat. No. 11,341,849.

(51) Int. Cl.
*G08G 1/0967* (2006.01)
*G08G 1/16* (2006.01)

(52) U.S. Cl.
CPC . *G08G 1/096725* (2013.01); *G08G 1/096783* (2013.01); *G08G 1/096791* (2013.01); *G08G 1/161* (2013.01); *G08G 1/167* (2013.01)

(58) Field of Classification Search
CPC ....... G08G 1/096725; G08G 1/096783; G08G 1/096791; G08G 1/161; G08G 1/167
See application file for complete search history.

(56) References Cited

U.S. PATENT DOCUMENTS 7,382,274 B1 6/2008 Kermani et al.
7,522,747 B2 4/2009 Horibe
7,990,286 B2 8/2011 Shankwitz
(Continued)

FOREIGN PATENT DOCUMENTS

CN 102542804 A 7/2012
CN 104386063 A 3/2015
(Continued)

OTHER PUBLICATIONS

International Search Report and Written Opinion from related international application No. PCT/IB2018/001408, dated Oct. 10, 2019, 21 pages.

(Continued)

*Primary Examiner* — John A Tweel, Jr.
(74) *Attorney, Agent, or Firm* — Brooks, Cameron & Huebsch, PLLC

(57) ABSTRACT

A method and apparatus according to the invention can include energizing a wireless communication device coupled to a processor of a vehicular entity thus establishing a secure channel or communication area around the vehicular entity;

exchanging information and data with other vehicular entities entering the established channel or communication area;

regulating some vehicle parameters of said vehicular entity for driving the departure and/or travelling of the vehicular entity according to the received information and data.

20 Claims, 25 Drawing Sheets

(56) References Cited

U.S. PATENT DOCUMENTS

| | | | |
|---|---|---|---|
| 9,829,888 B2 | 11/2017 | Reiff | |
| 10,749,680 B1 | 8/2020 | Troia | |
| 11,341,849 B2 * | 5/2022 | Troia | G08G 1/096783 |
| 2011/0080302 A1 | 4/2011 | Muthaiah et al. | |
| 2015/0269845 A1 | 9/2015 | Calmettes et al. | |
| 2018/0018876 A1 | 1/2018 | Kumabe | |
| 2018/0079419 A1 | 3/2018 | Yamamoto | |

FOREIGN PATENT DOCUMENTS

| | | | |
|---|---|---|---|
| CN | 105471874 | A | 4/2016 |
| EP | 2306423 | A1 | 4/2011 |
| EP | 3273421 | A1 | 1/2018 |
| WO | 2018108293 | A1 | 6/2018 |

OTHER PUBLICATIONS

Microsoft Research With Paper: DICE: Device Identifier Composition Engine, 2015.

* cited by examiner

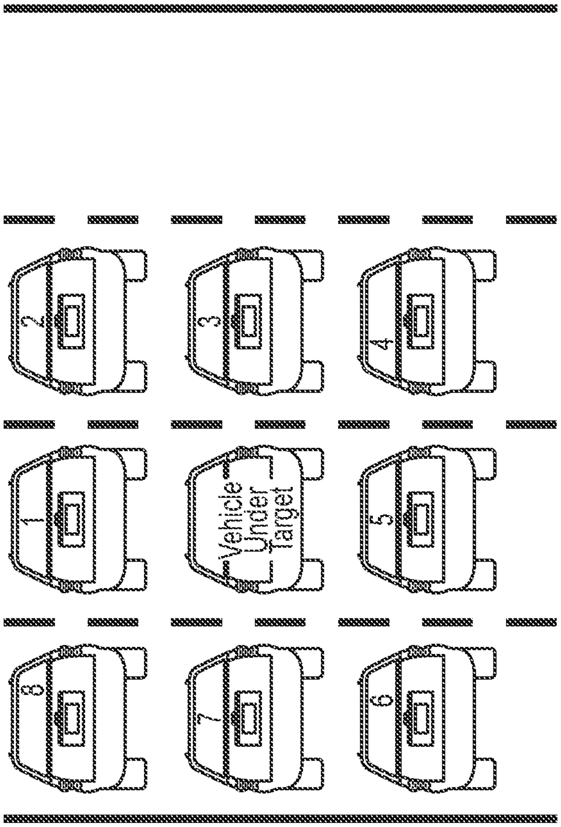

| | | |
|---|---|---|
| $ID_{L28}$ public<br>$ID_{L28}$ Certificate<br>$K_{L28}$ public key | $ID_{L21}$ public<br>$ID_{L21}$ Certificate<br>$K_{L21}$ public key | $ID_{L22}$ public<br>$ID_{L22}$ Certificate<br>$K_{L22}$ public key |
| $ID_{L27}$ public<br>$ID_{L27}$ Certificate<br>$K_{L27}$ public key | $ID_{L1}$ public<br>$ID_{L1}$ Certificate<br>$K_{L1}$ public key | $ID_{L23}$ public<br>$ID_{L23}$ Certificate<br>$K_{L23}$ public key |
| $ID_{L26}$ public<br>$ID_{L26}$ Certificate<br>$K_{L26}$ public key | $ID_{L25}$ public<br>$ID_{L25}$ Certificate<br>$K_{L25}$ public key | $ID_{L24}$ public<br>$ID_{L24}$ Certificate<br>$K_{L24}$ public key |

FIG. 21

LANE DEPARTURE APPARATUS, SYSTEM AND METHOD

PRIORITY INFORMATION

This application is a Continuation of Ser. No. 16/624,580 filed on Dec. 19, 2019, which will issue as U.S. Pat. No. 11,341,849 on May 24, 2022, which is a National Stage Application under 35 U.S.C. § 371 of International Application Number PCT/IB2018/001408, filed on Dec. 7, 2018, the contents of which are incorporated herein by reference.

TECHNICAL FIELD

The present disclosure relates generally to apparatus, systems and methods related to vehicles, and more particularly, to allow lane departure and traveling on parallel lanes for autonomous vehicles.

BACKGROUND

Motor vehicles, such as autonomous and/or non-autonomous vehicles, (e.g., automobiles, cars, trucks, buses, etc.) can use sensors and/or cameras to obtain information about their surroundings so that they can operate safely. For example, autonomous vehicles can control their speed and/or direction and can recognize and/or avoid obstacles and/or hazards based on information obtained from sensors and/or cameras. For example, vehicles may use light detection and ranging (LIDAR), vehicle-to-everything (V2X), RADAR, and/or SONAR detection techniques, among others, to obtain information about their surroundings.

As used herein, an autonomous or partially autonomous vehicle can be a vehicle in which at least a portion of the decision-making and/or control over vehicle operations is controlled by computer hardware and/or software/firmware, as opposed to a human operator. For example, an autonomous vehicle can be a driverless vehicle.

It's also known that lane departure is one of the most complicated tasks for an autonomous vehicle.

Up to now lane departure is studied trying to implement optical, electronics and also artificial intelligence mechanisms that should take in consideration various parameters such as: speed, right time to insert in lane, position of the other vehicles and road conditions.

However, lane departure in a mixed environment, i.e. an environment with the presence of autonomous driving vehicles and other vehicles on the road, is still not easy to implement.

BRIEF DESCRIPTION OF THE DRAWINGS

FIG. 21 is a schematic view of a correspondence between the vehicle configuration of FIG. 1 with a matrix of information and data exchanged between a target vehicle and the vehicular entities surrounding it on parallel lanes;

DETAILED DESCRIPTION

Figure 1:
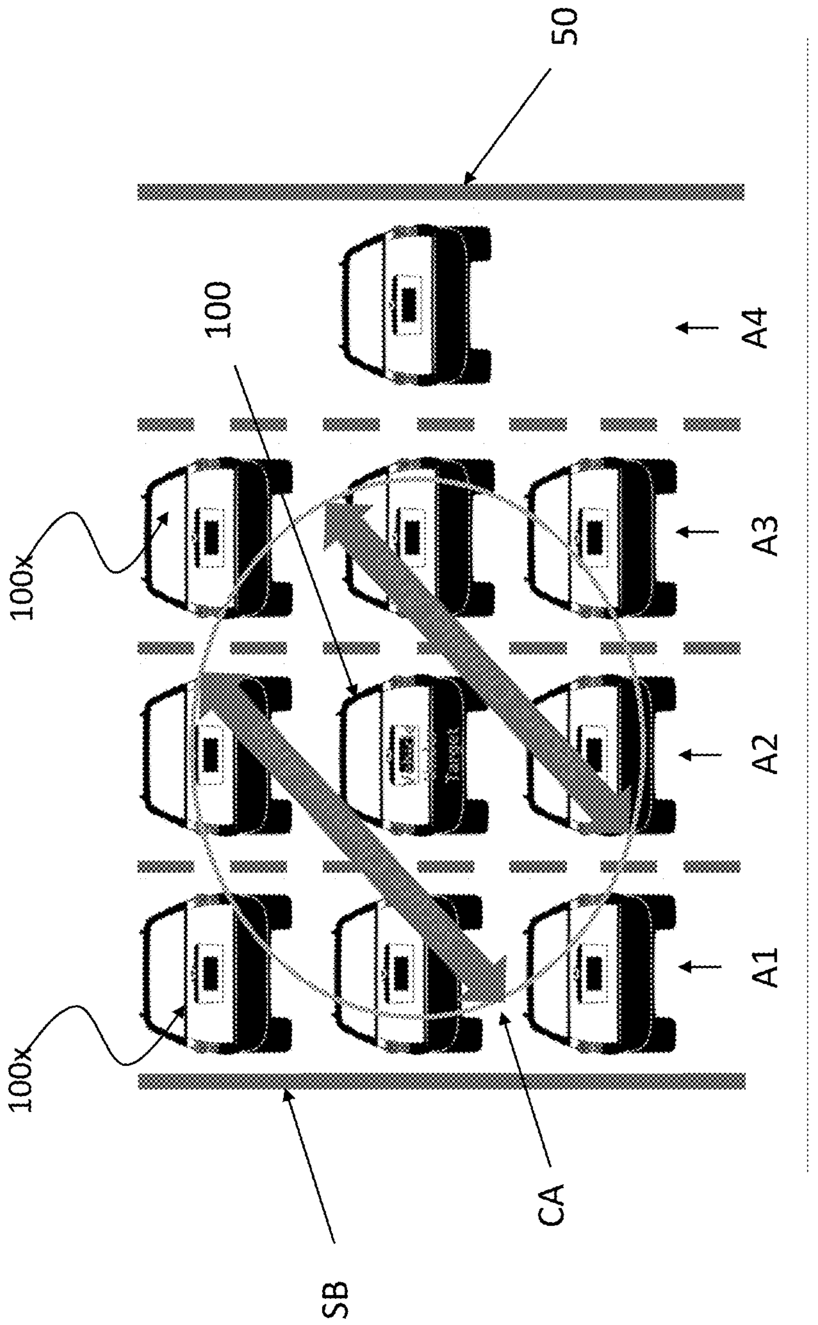
FIG. 1 illustrates a schematic example of a transportation environment, including autonomous driving vehicles and other vehicular entities, in accordance with embodiments of the present disclosure.

Embodiments of the present disclosure include at least a target vehicle 100 comprising one or more communication devices, such as passive near field tags, as well as other vehicles 100*x* surrounding the target vehicle 100 and comprising one or more communication devices. The target vehicle 100 and the other vehicles 100*x* may be autonomous vehicles and/or non-autonomous vehicles.

Embodiments of the present disclosure may further include passive or active wireless communication devices along a route 50 (e.g., a road) travelled by vehicles 100 or 100*x*, such as autonomous vehicles and/or non-autonomous vehicles.

The mentioned vehicles 100 or 100*x* can supply power to (e.g., energize) the communication devices. The energized communication devices can provide information about the route 50 to the vehicles. The information can be used to make decisions about the operation of the vehicles 100 or 100*x*, such as the speed and/or direction of travel of the vehicles, or the like.

In previous approaches, vehicles have used cameras and sensors to obtain information about their surroundings. However, the operation of these cameras and sensors can depend on weather conditions and can be hampered by inclement weather conditions. The passive wireless communication devices can provide redundancy that can improve vehicle operation, resulting in technological improvements to the vehicle. For example, information provided by the passive wireless communication devices can be used if cameras and/or sensors fail, such as due to weather-related events.

In some previous approaches, vehicles have used sensors, such as vehicle to infrastructure (V2I) sensors, to obtain route information from infrastructure components along a route, such as overhead radio frequency identification (RFID) readers, cameras, traffic lights, lane markers, streetlights, signage, parking meters, or the like. However, infrastructure components are typically powered by a power grid and can be susceptible to power grid outages. For example, communications between the vehicle and infrastructure components can be interrupted in the event of a power outage. This problem is solved by the present disclosure, in that the passive wireless communication devices are powered by the vehicle and can provide information to the vehicle regardless of whether a power grid outage occurs. This results in improved vehicles by improving vehicle performance.

The present disclosure relates to apparatuses and methods using messages having as content at least the following parameters:

- Position of the vehicles 100*x* around a target vehicle 100;
- Speed of the vehicles 100*x* around a target vehicle 100;
- Braking distance and/or braking time of the vehicles 100*x* around the target vehicle 100.
- Other fixed data may be exchanged such as the Vehicle Identification Number (VIN) and the plate.

As is well known, different type of vehicles and/or vehicles having different aging can show different braking efficiency. This difference is relevant for detecting the real position and speed of the vehicles 100*x* surrounding a target vehicle 100 on a route 50 wherein it is possible to travel along parallel lanes, for instance the lanes: A1, A2, A3 and A4 shown in FIG. 1.

In one embodiment of the present disclosure, the messages concerning the above parameters are exchanged in a secure environment; for example, the vehicles 100*x* around the target vehicle 100 will establish secure communication using a DICE-RIoT methodology that is a Microsoft specification used to exchange public key and certificates and/or to verify the received certificate.

Moreover, in one example a secure channel or communication area CA is defined as containing up to eight vehicles 100*x*, plus the target vehicle 100. The secure channel area has a variable shape or a variable sphere of influence and it can be defined using any other technology available on the vehicle, i.e. LiDAR, Radar, Cameras, etc. Of course, the above number is not a limiting example and a higher number of vehicles may be accounted for within a communication area CA.

The possible presence of solid borders SB separating the route 50 from the countryside or separating the lanes one from the other can change the number of vehicles 100, 100*x* that are taken in consideration for exchanging messages including information and data. In other words, the secure channel or communication area CA has a sphere of influence that is delimited by the solid borders of the route 50 or between the lanes A1, A2, A3 or A4.

It is worthwhile noting that the maximum number of vehicles around the target one may depend on the target vehicle itself, for example based on its length (i.e. a car or a truck). Moreover, the absence of a vehicle 100*x* may change the maximum number of vehicles around the target one, as will be clear by the following description.

The vehicles 100 or 100*x* belonging to or that may be considered within the mentioned secure channel area CA are only the vehicles driving in the same direction and the same road.

According to one embodiment of the present invention it will be disclosed an apparatus for allowing lane departure and travelling along parallel lanes of a route, comprising:

- a processor on a vehicular entity; and
- a communication device coupled to the processor and structured to define a secure channel or communication area around said vehicular entity;
- said communication device exchanging information and data with other communication devices or components of other vehicular entities entering said secure channel area to regulate through said processor the departure and/or travelling of the vehicular entity according to the received information and data.

The secure channel area has a variable shape or sphere of influence according to the number of other vehicular entities around said vehicular entity.

In one embodiment of the present disclosure, the exchanged information and data include at least position, speed and braking distance or braking time of the other vehicular entities around said vehicular entity. Moreover, other info may also be added such as road conditions detected by the vehicle that can change the reaction time to avoid accidents.

According to another embodiment of the present invention it will be disclosed a method for allowing lane departure and travelling along lanes of a route, comprising:

energizing a wireless communication device coupled to a processor of a vehicular entity establishing a secure channel or communication area around the vehicular entity;

exchanging information and data with other vehicular entities entering said channel or communication area;

regulating vehicle parameters of said vehicular entity for driving the departure and/or travelling of the vehicular entity according to the received information and data.

In one embodiment of the present disclosure, further information and data are exchanged with external passive communication components located on solid borders along the route or lane over which the vehicular entity is traveling.

Moreover, the above mentioned regulating phase includes adjusting at least an operational parameter of the vehicular entity according to at least position, speed and braking distance or braking time of the other vehicular entities travelling around said vehicular entity.

In one embodiment of the present disclosure, the max distance kept between vehicles is given by the slowest vehicle, in braking, around the target vehicle 100. It should be noted that the information about the braking distance/time gives to the vehicle (driver) the confidence that there is enough space to make a lane change.

FIG. 1 is a schematic example of a route 50, such as an autoroute or a road, wherein a plurality of vehicular entities 100*x* are travelling on parallel lanes A1, A2, A3, A4. We will focus our attention on the vehicular entity 100 located in a central position on lane A2 and surrounded all around by other vehicular entities 100*x* of the lanes A1, A2 and A3. This vehicular entity 100 will also be defined as target vehicle.

The target vehicle 100 travels in the proximity of the other vehicular entities 100*x* so that a secure channel of communication area CA may be defined around the target vehicle 100. Such an area CA may be considered a space entity wherein a wireless communication transmission between active and passive wireless communication devices may be established in a secure manner.

Figure 2:
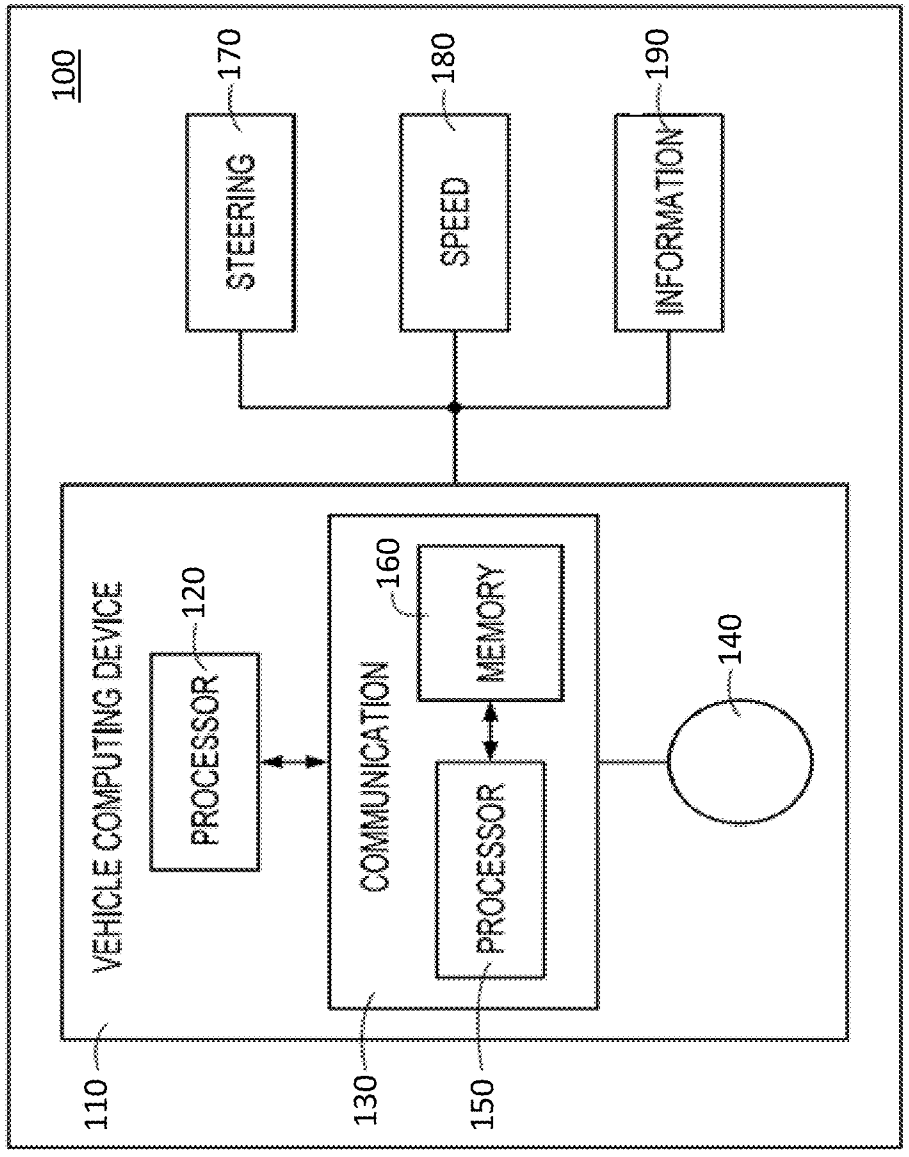
FIG. 2 shows a block diagram of an example of vehicular entity, in accordance with embodiments of the present disclosure.

FIG. 2 is a block diagram example of the vehicular entity 100 or target vehicle in accordance with an embodiment of the present disclosure. The vehicular entity 100 can be an autonomous vehicle, a traditional non-autonomous vehicle, an emergency vehicle, a service vehicle, or the like, and that can be referred to as an apparatus.

As shown in FIG. 2, the vehicular entity 100 can include a vehicle computing device 110, such as an on-board computer. The vehicle computing device 110 can include a processor 120 coupled to a vehicular communication component 130, such as a reader, writer, and/or other computing device capable of performing the functions described below, that is coupled to (or includes) an antenna 140. Even the road may be provided with base stations and antenna to communicate messages; what is important is that the electromagnetic field of the road antenna and the electromagnetic field of the infrastructure could interfere to exchange information. In the case of the RFID, the vehicle antenna provides also the power to turn on the RFID embedded in the road. The vehicular communication component 130 includes a processor 150 coupled to a memory 160, such as a non-volatile flash memory, although embodiments are not so limited.

The vehicle computing device 110 can control operational parameters of the vehicular entity 100, such as steering and speed. For example, a controller (not shown) can be coupled to a steering control system 170 and a speed control system 180. Further, the vehicle computing device 110 can be coupled to an information system 190. Information system 190 can be configured to display a message, such as the route information or a border security message and can display visual warnings and/or output audible warmings. The communication component 130 can receive information from additional computing devices, such as from external computing devices as schematically depicted in FIG. 2.

Figure 3:
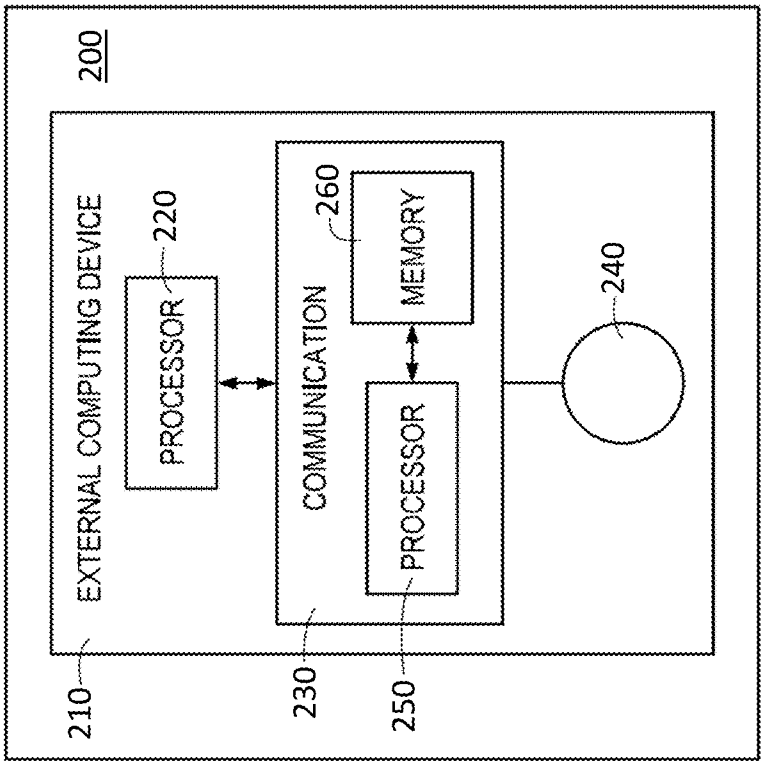
FIG. 3 shows a block diagram of an example of an external entity if compared to the vehicular entity, such an external entity could be another vehicular entity, in accordance with embodiments of the present disclosure.

FIG. 3 is a block diagram example of an external entity 200, such as a device arranged on board of a vehicular entity 100*x* travelling close to the target vehicle 100 or, as an alternative, a road control entity or a border control entity or, more generally, a control entity.

The external entity 200 includes an external computing device 210, such as an on-board computer. External computing device 210 can include a processor 220 coupled to an external communication component 230, such as a reader, writer, and/or other computing device capable of performing the functions described below, that is coupled to (or includes) an antenna 240. The communication component 230 can in turn include a processor 250 coupled to a memory 260, such as a non-volatile flash memory, although embodiments are not so limited. The antenna 240 of the external computing device 210 can be in communication with the antenna 140 of the vehicular entity 100 of FIG. 2.

In some examples, antennas 240 and 140 can be loop antennas configured as inductor coils, such as solenoids. Antenna 140 can loop around vehicular entities 100 or 100*x*, for example. Antenna 140 can generate an electromagnetic field in response to current flowing through antenna 140. For example, the strength of the electromagnetic field can depend on the number of coils and the amount of current.

The electromagnetic field generated by antenna 140 can induce current flow in an antenna 240 that powers the respective external computing device 210 and vice versa. As an example, antenna 140 in FIG. 2 can induce current flow in antenna 240 when vehicular entity 100 brings antenna 140 to within a communication distance (e.g., a communication range) of the antenna 240. Such a distance may be considered within the influence of the secure channel or communication area CA.

For example, the communication distance can depend on the strength of the electromagnetic field generated by the antenna 140. The electromagnetic field generated by the antenna 140 can be set by the number of coils of antenna 140 and/or the current passing through antenna 140. In some examples, the communication distance can be of few meters between the communication devices, mainly if those devices are powered.

In some examples, the external computing device 210 can include a plurality of wireless communication devices, such as transmitters, transponders, transceivers, or the like. As an example, the external communication component 230 can be such a wireless communication device. In some examples, wireless communication devices can be passive wireless communication devices that are powered (e.g., energized) by the vehicular entities 100 or 100*x*, as described above.

Wireless communication devices can also be located along the route and the lanes A1, A2, A3 or A4, on which vehicular entities 100 or 100*x* can travel, or at a custom or border security stations that the vehicular entities may cross.

For example, wireless communication devices can be embedded in the roads, embedded and/or located on the walls of a tunnel along the route or walls of a station at a border, located on signs, such as traffic signs, along the route, located in and/or on traffic-control lights along the route, located in and/or on other vehicles along the route, on (e.g., carried by and/or worn by) officers along the route, or the like.

Wireless communication devices on board or along the route 50 can transmit information to vehicular entities 100*x* in response to being powered by the target vehicle 100 and/or collect information from the target vehicle 100 in response to being powered by the vehicular entities 100*x*. Moreover, the external communication device can be structured to activate the communication component of an approaching vehicle.

Wireless communication devices can be short-range wireless communication devices, such as near field communication (NFC) tags, RFID tags, or the like.

In at least one embodiment, wireless communication devices can include non-volatile storage components that can be respectively integrated into chips, such as microchips. Each of the respective chips can be coupled to a respective antenna. The respective storage components can store respective data/information.

In some examples, wireless communication devices can be reprogrammable and can be wirelessly reprogrammed in situ. For examples in which wireless communication devices are NFC tags, a wireless device with NFC capabilities and application software that allows the device to reprogram the NFC tags can be used to reprogram the NFC tags.

The wireless communication devices can transmit data/information to the communication component 130 in response to vehicular entity 100 or 100*x* passing within the communication distance of the wireless communication devices. The information can be transferred in the form of signals, such as radio frequency signals. For example, devices can communicate using radio frequency signals.

For examples in which wireless communication devices are NFC tags, the communication component 130 can be an NFC reader and can communicate with wireless communication devices using an NFC protocol that can be stored in memory 160 for processing by processor 150. For example, communication component 130 and wireless communication devices can communicate at about 13.56 mega-Hertz according to the ISO/IEC 18000-3 international standard for passive RFID for air interface communications. For example, the information can be transmitted in the form of a signal having a frequency of about 13.56 mega-Hertz.

In some examples, the communication distance may be set such that wireless communication devices are activate or deactivate when vehicular entity 100 or 100*x* is within a specific range close to the wireless communication devices. For example, wireless communication devices can transmit information to the communication component 130, indicating that vehicular entity is approaching a lane border SB. For example, the transmitted information can indicate that the vehicular entity 100 or 100*x* is too close to another vehicular entity 100*x* and the communication component 130 can transmit the information to the processor 150. The processor 150 can cause information system 190 to display a visual warning and/or sound an audible alarm, indicating that target vehicle 100 is too close to the adjacent vehicular entity 100*x*.

Moreover, the wireless communication devices can include information that is specific to and recognized only by particular vehicles that form a particular subset of all the vehicles passing by wireless communication devices, such as emergency vehicles (e.g., police or fire vehicles ambulances, or the like) or service vehicles. In examples wherein the vehicular entity 100 or 100*x* is such a vehicle, communication component 130 can be configured to recognize that information.

Communication component 130 can therefore be configured to energize or to be energized by an external communication device and write the information to the external communication device, providing to an adjacent vehicular entity 100*x* all the information related to the other vehicular entity 100*x* or the target vehicle 100, such as driver/passenger IDs or also to the goods carried by the vehicle.

Making reference to the example shown in FIGS. from 5 to 11, it may be appreciated that the secure channel area CA has a variable shape and it may be defined using any other technology available on the vehicle, i.e. LiDAR, Radar, Cameras, etc. or embedded tags in the road.

However, it should be considered that the maximum distance used is given by the slowest vehicle 100*x*, in braking, around the target vehicle 100. Generally speaking the braking distance/time gives to the vehicle (driver) the confidence that there is enough space to make a lane change.

Figure 4:
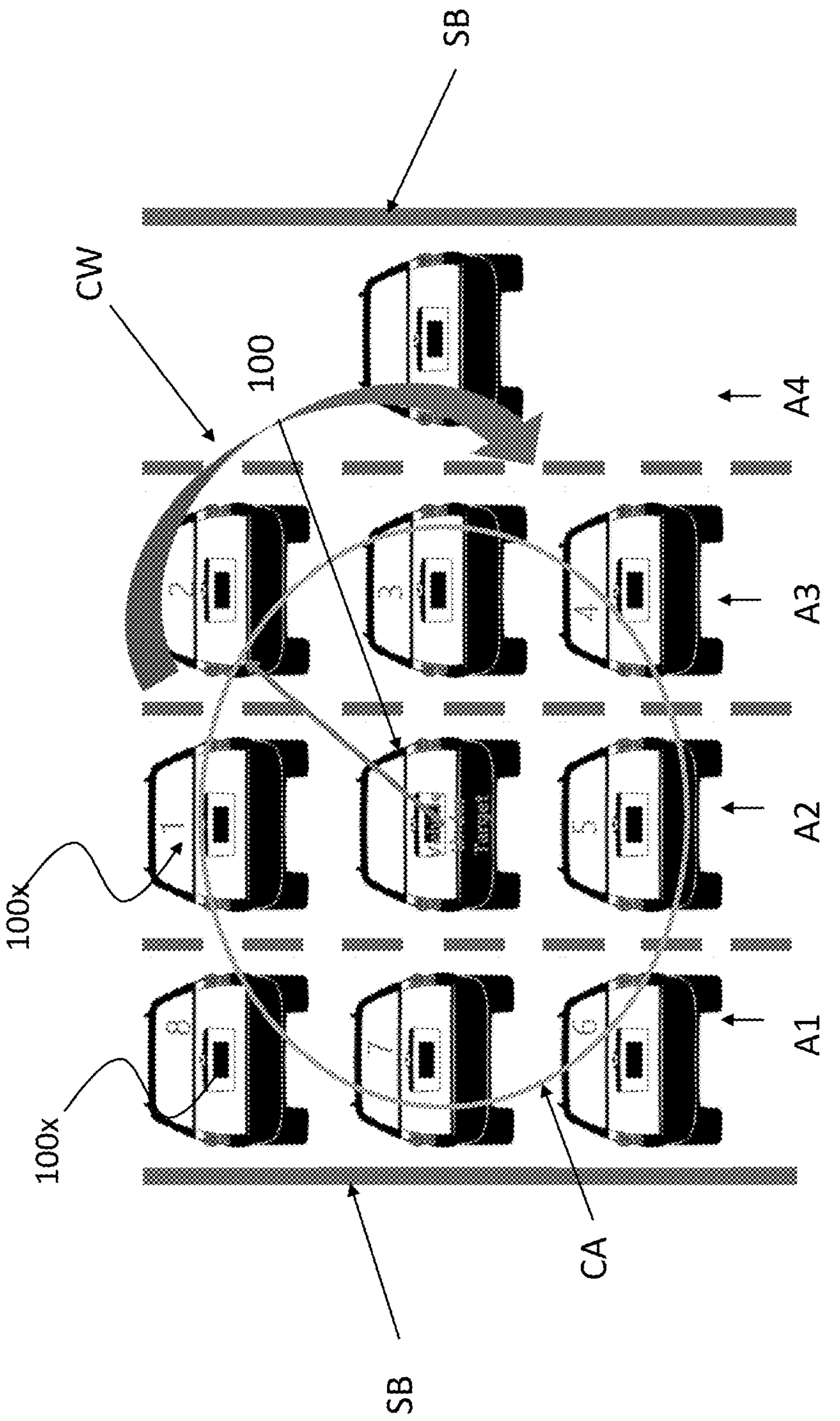
FIG. 4 illustrates a further example of a transportation environment wherein it may be defined a secured channel area including autonomous driving vehicles and other vehicular entities, in accordance with embodiments of the present disclosure.

In one embodiment of the present disclosure, according to the invention, the secure channel area CA is defined or built using a DICE-RIoT specification method and using as a starting reference the vehicular entity 100*x*-1 located in front of the target vehicle 100 as first vehicle and going in a clockwise direction CW, as shown in FIG. 4.

If we consider the example of FIG. 4 as a matrix of nine vehicular entities, including the central target vehicle 100, we may identify each vehicle 100*x* of this matrix with a reference number given by its position in a clockwise direction starting from the upper central vehicular entity.

So, the vehicle 100*x*-1 is located in front of the target vehicle 100 (or above in the 2D FIG. 1) and is always the first, if present, of the group of vehicles 100*x* that may establish a wireless communication with the travelling target vehicle 100.

In this respect, the vehicle 100*x*-8 in the upper corner left is always the last, if present.

Only a few rules are necessary to handle properly the whole communication process. For instance, if a vehicle 100*x* is not present the exchange of the information between vehicles is skipped to the next vehicle of the matrix following the clockwise direction of the authentication.

If a vehicle 100*x* enters in the secure channel area CA, the authentication process starts just from this last vehicle entering in the area CA.

A solid barrier SB delimiting a lane A1, A2, A3 or A4 is considered as a street barrier and the vehicles beyond that barrier are not authenticated.

Let's see in more details these situations with the help of the figures.

Referring to the schematic view of FIG. 4, eight authentications are needed because eight vehicles from 100*x*-1 to 100*x*-8 are surrounding the target vehicle 100 that is in the middle of the matrix of nine vehicles covered by the secure channel area CA.

Figure 5:
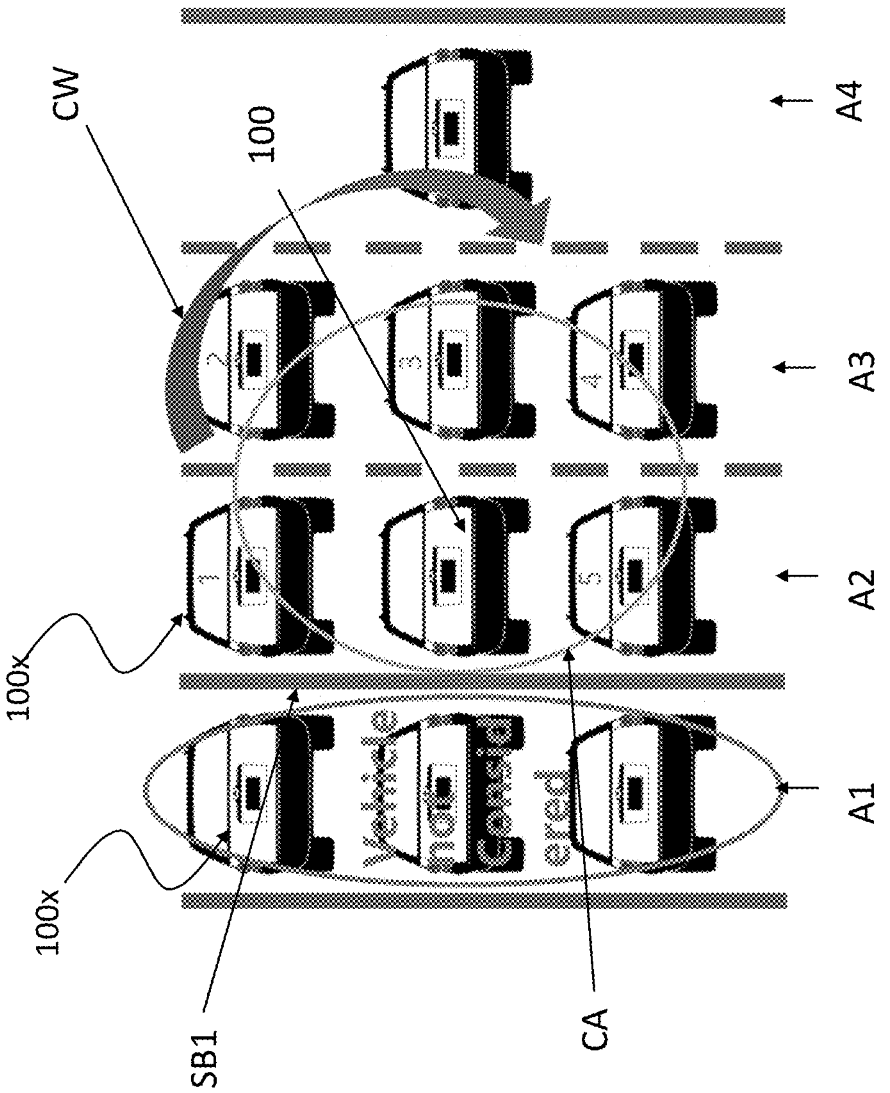
FIG. 5 illustrates a further example of a transportation environment wherein a target vehicle is surrounded by autonomous driving vehicles and/or other vehicular entities within a secure channel area, in accordance with embodiments of the present disclosure.

FIG. 5 shows another situation wherein only five authentications are needed since the lane on the left side is delimited by a solid border SB1 defining a fixed reference, therefore the target vehicle 100 cannot move toward its left side.

In this situation the vehicles trapped in the lane A1 beyond the solid border SB1 are not taken in consideration for the authentication process later disclosed. The secure channel area covers only five vehicles from 100*x*-1 to 100*x*-5 circling partially the target vehicle 100.

The solid border SB1 separating the lanes A1 and A2 can be detected using tags as will be later disclosed.

Figure 6:
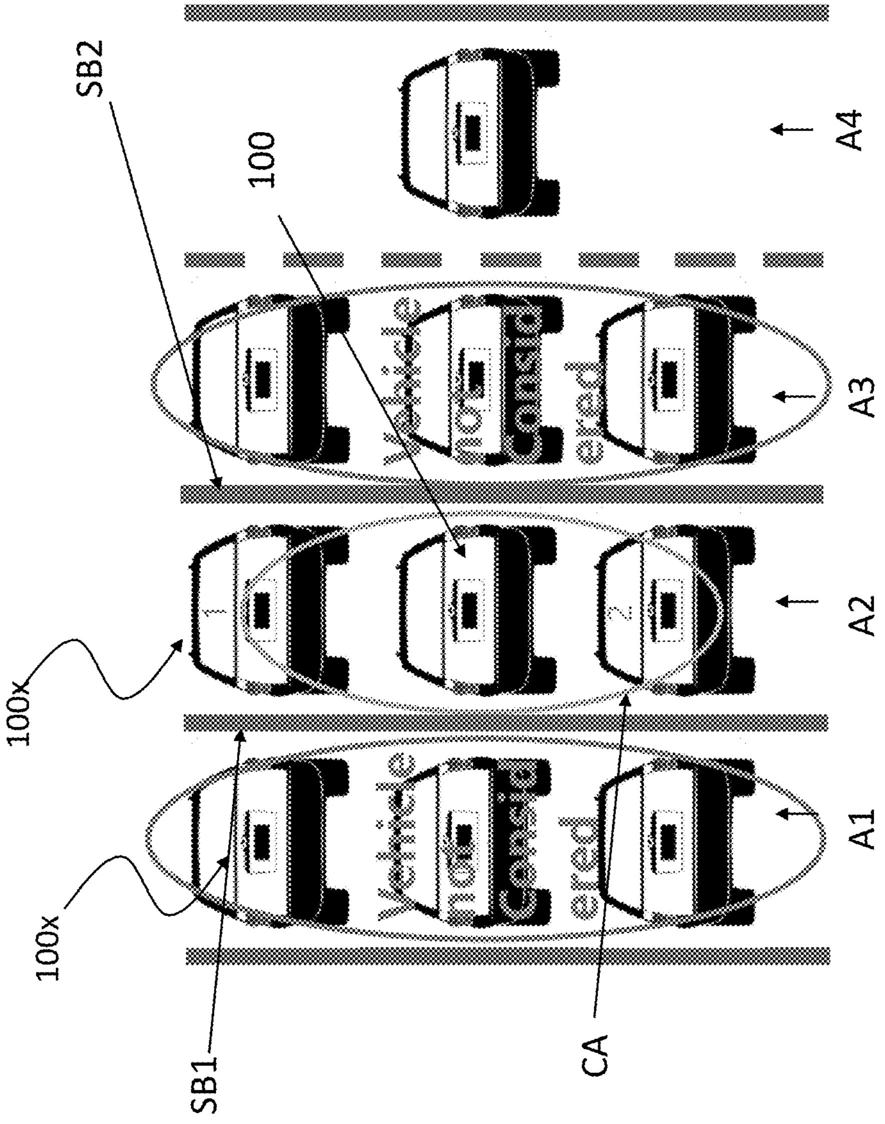
FIG. 6 illustrates an alternative example of a transportation environment wherein a target vehicle is surrounded by autonomous driving vehicles and/or other vehicular entities within a secure channel area.

A further example is shown in FIG. 6 wherein a central lane is delimited on both sides by solid borders SB1 and SB2. The target vehicle 100 is still in the central position and only two authentications will be needed detecting only the travelling vehicular entities 100x-1 and 100x-2 in view of presence of the solid borders SB1, SB2 on the left and right of the target vehicle 100.

Again, the solid borders SB1 and SB2 delimiting the central lane A2 can be detected using tags or other technologies as will be later disclosed.

Figure 7:
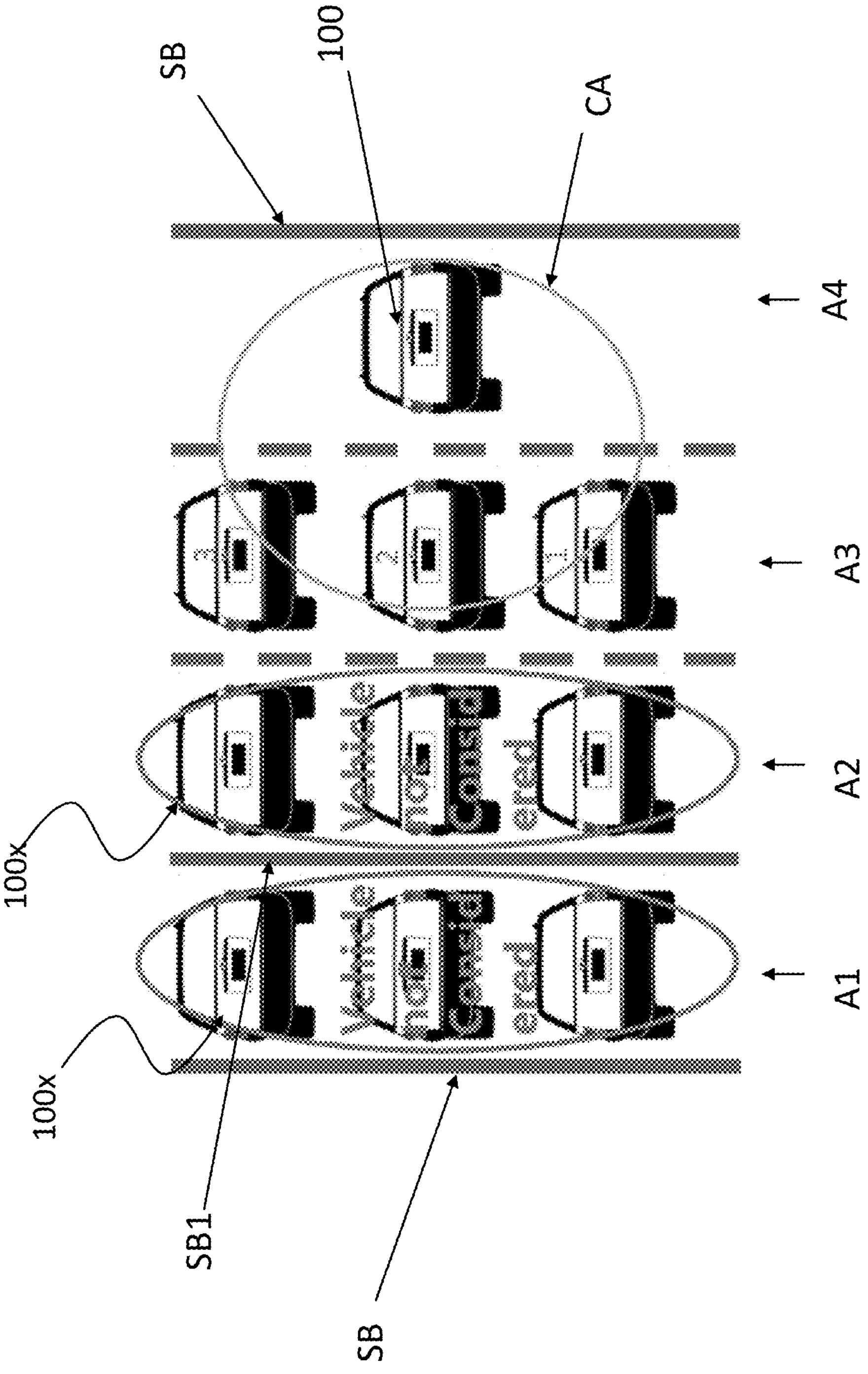
FIG. 7 illustrates a further alternative example of a transportation environment wherein a target vehicle is surrounded by autonomous driving vehicles and/or other vehicular entities within a secure channel area.

A further example is shown in FIG. 7 wherein the target vehicle 100 is travelling alone on the right lane A4 and is travelling in parallel with other three vehicular entities 100x-1, 100x-2 and 100x-3 located in lane A3 one after the other. The secure channel area CA is reduced and covers only the four vehicles including the target vehicle 100 of lane A4 and the three vehicles travelling at its left side in lane A3.

Authentication in this case is needed just for the three vehicles located at the left side of the target vehicle 100.

Figure 8:
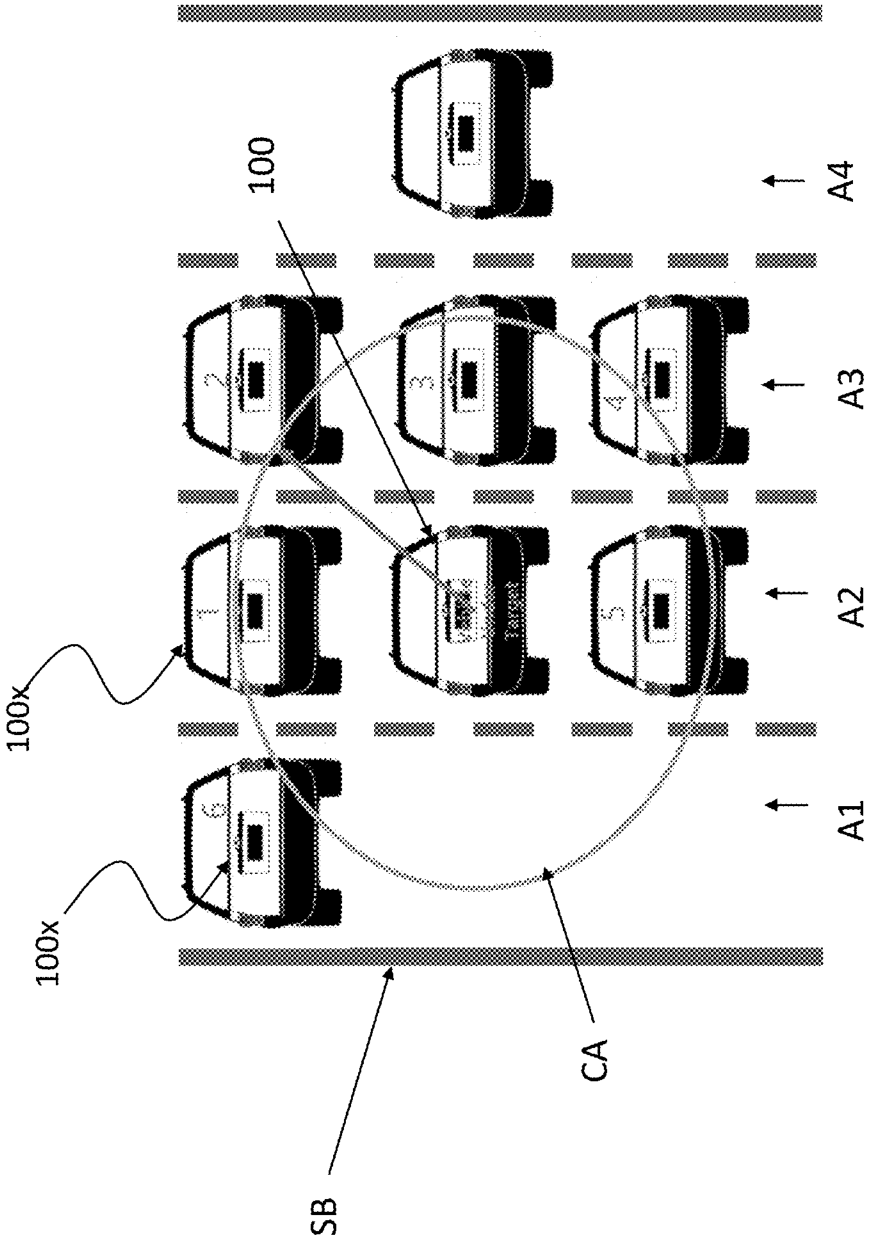
FIG. 8 illustrates a further alternative example of a transportation environment wherein a target vehicle is surrounded by autonomous driving vehicles and/or other vehicular entities within a secure channel area.

A further example is shown in FIG. 8 wherein the target vehicle 100 has a partially free lane A1 at its left side and may decide to overcome the preceding vehicular entity 100x-1. The secure channel area CA covers seven vehicular entities including the target vehicle 100, the vehicular entity 100x-6 travelling alone in lane A1 and the other five vehicles 100x-1, . . . , 100x-5 partially surrounding the target vehicle 100.

Figure 9A:
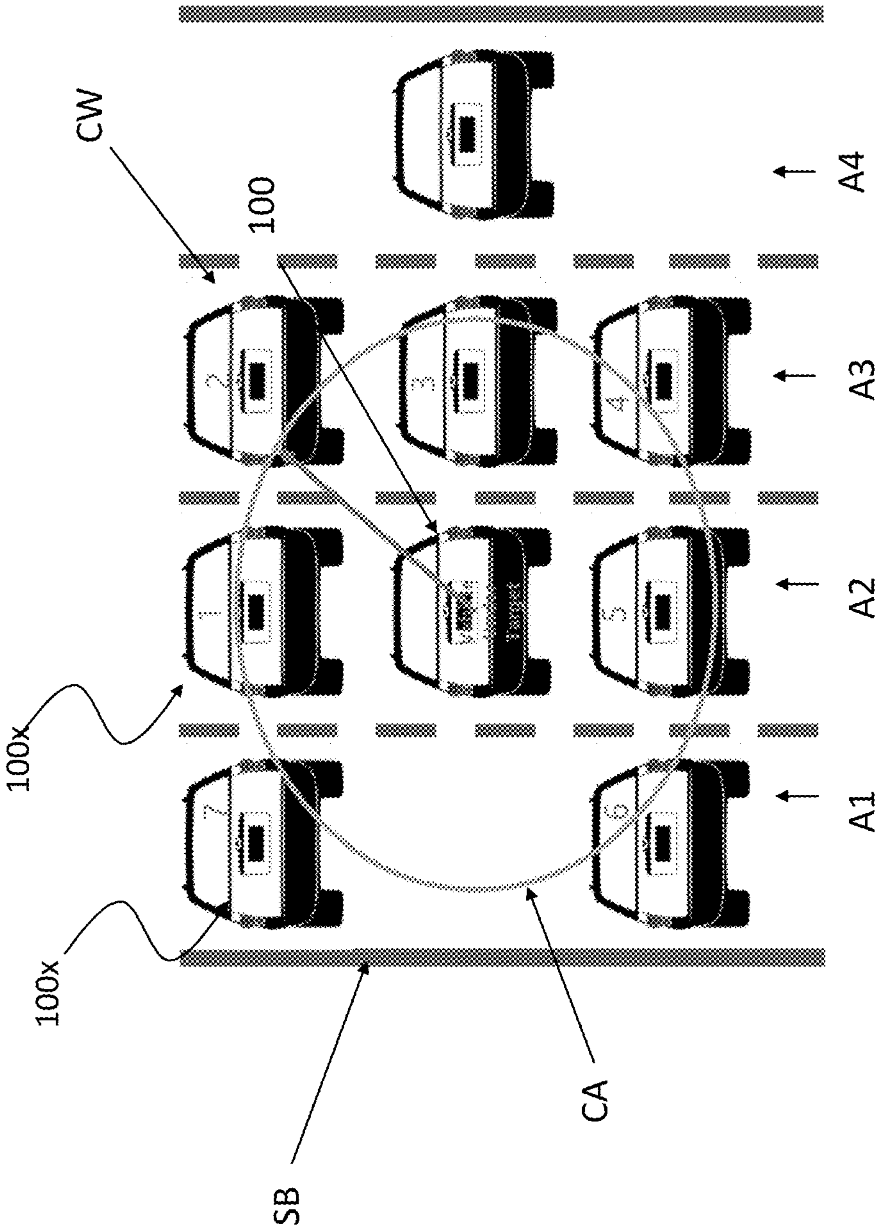
FIG. 9A illustrates another example of a transportation environment wherein a target vehicle is surrounded by autonomous driving vehicles and/or other vehicular entities within a secure channel area.

This example of FIG. 8 is strictly connected with the further example of FIG. 9A wherein an approaching vehicular entity 100x-6 travelling in lane A1 is reaching the secure channel area CA thus partially limiting the freedom of the target vehicle 100 to gain the lane A1 to overcome the proceeding vehicular entity 100x-1.

In this case a new authentication or re-authentication of the vehicular entities 100x-6 and 100x-7 is necessary since both these vehicular entities are now under the influence of the secure channel area CA. Therefore, the speed of the approaching vehicle 100x-6 should be detected with respect to the proceeding vehicle 100x-7 to check the space potential left in lane A1 for a possible change of lane of the target vehicle 100.

After having considered various possible different situations that may happen in a regular travelling environment along a route 50 with parallel lanes A1, A2, A3 and A4, we will now focus the attention on the authentication process previously mentioned.

Figure 10:
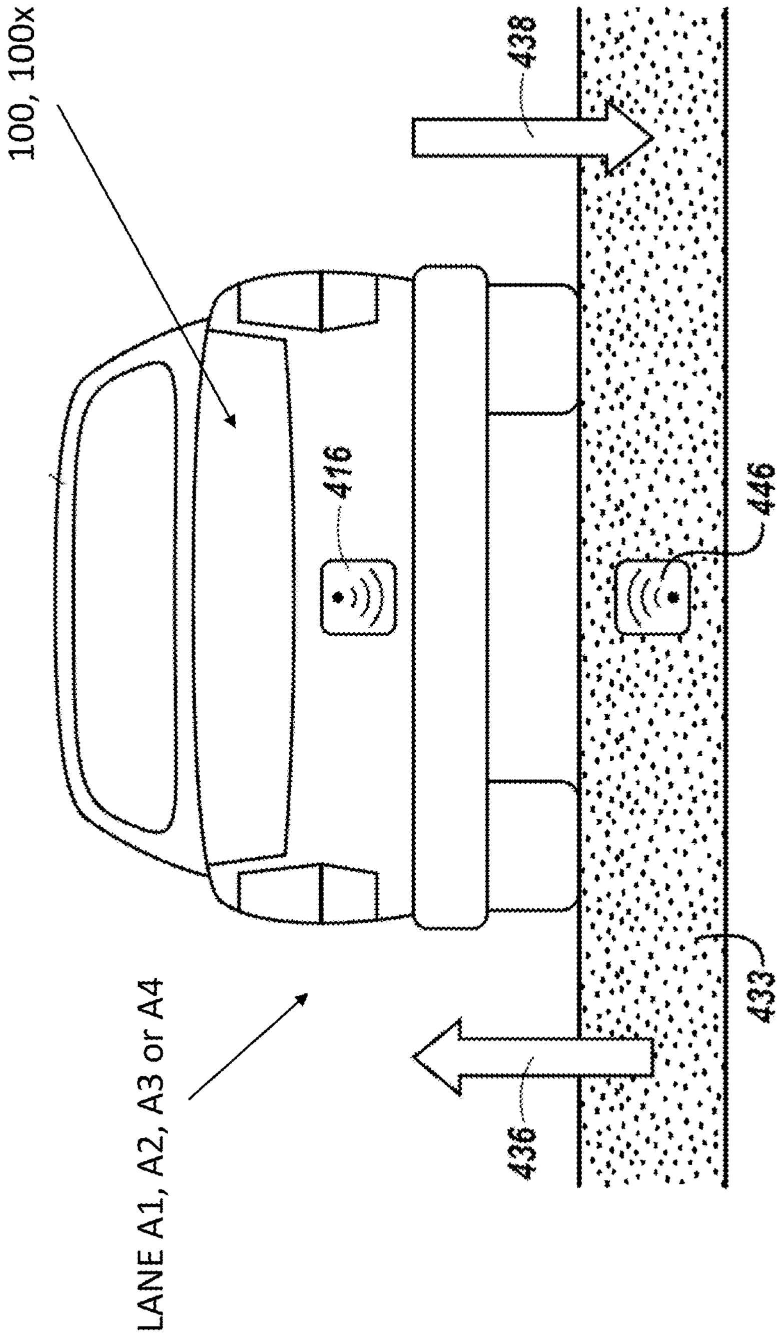
FIG. 10 illustrates an example of transportation environment, including a transportation assistance entity and a vehicular entity, in accordance with embodiments of the present disclosure.
Figure 11:
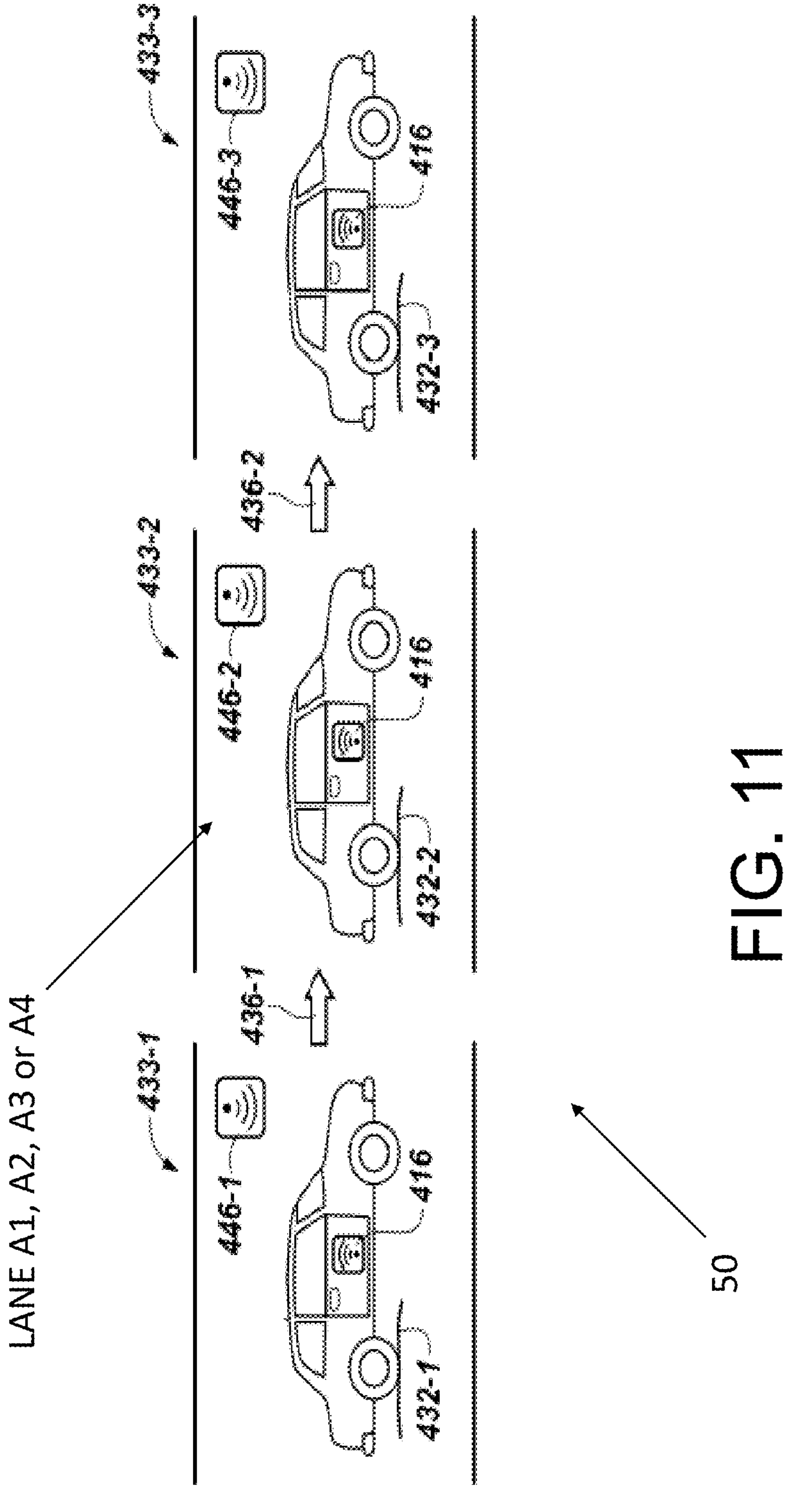
FIG. 11 is a block diagram of an example system including an external communication component and a vehicular communication component in accordance with embodiments of the present disclosure.

FIGS. 10-11 each illustrate an example transportation environment such as the route 50, including a transportation assistance entity 433 and a vehicular entity 100 or 100x, in accordance with an embodiment of the present disclosure. As illustrated in FIG. 10, an external communication component 446 can be embedded within, positioned on, or attached to a transportation assistance entity 433, such as a road lane. As an example, an external communication component 446 can be embedded within a transportation assistance entity 433. As is illustrated, the transportation assistance entity 433 is a road lane.

The vehicular entity 100 or 100x can include a vehicular communication component 416 that is in communication with the external communication component 446. The vehicular entity 100 or 100x can drive in a first direction, indicated by arrow 436, along the transportation assistance entity 433 and in a second direction, indicated by arrow 438, along the transportation assistance entity 433. In this way, the vehicular entity can travel towards, across, and/or away from the external communication component 446.

As the vehicular communication component 416 of the vehicular entity 100 or 100x approaches within a particular proximity, for instance a couple of meters, of the external communication component 446, communication can begin and/or become strengthened. Although the transportation assistance entity is illustrated as including a road lane, embodiments of the present disclosure are not limited to this example of transportation assistance entities.

FIG. 11 is an illustration of vehicular entities 100 or 100x within the transportation environment 50 at different points of entry, engagement, and departure in relation to a transportation service being provided. As an example, the vehicular entity 100 or 100x can travel over a first location 432-1 of a first road lane portion 433-1. The first road lane portion 433-1 can include a first external communication component 446-1. As the vehicular entity 100 or 100x comes in close proximity, as said couple of meters, to the vehicular communication component external communication component 446-1, the vehicular communication component 416 can communicate with the external communication component 446-1. The communication can indicate that the vehicular entity 100 or 100x has entered an entrance for receiving a transportation service. While at the first location 432-1, the vehicular communication component 416 can send a vehicular public key to the external communication component 446-1 and the external communication component 446-1 can send an external public key to the vehicular communication component 416.

These public keys (vehicular and external) can be used to encrypt data sent to each respective communication component and verify an identity of each and exchange invoice, confirmation, and payment information. The communication can also be performed without any encryption but only signed, thus allowing the controller to verify that the sender is the right one (using the public key). As an example, as will described further below in association with FIGS. 12-16, the vehicular communication component 416 can encrypt data using the received external public key and send the encrypted data to the external communication component 446-1. Likewise, the external communication component 446-1 can encrypt data using the received vehicular public key and send the encrypted data to the vehicular communication component 416. Data, such as service data sent by the vehicular entity 100 or 100x can include credit card information, phone number, email address, identification information, payment information, etc.

Further, as the vehicular entity 100 or 100x travels, as illustrated by arrow 436-1, to a second location 432-2 of a second road lane portion 433-2, the vehicular communication component 416 can communicate with an external communication component 446-2 of the second road lane portion 433-2. Communication between the vehicular communication component 416 and the external communication component 446-2 can indicate that the vehicular entity 100 or 100x is in the location 432-2 for instance to receive a transportation service.

As the vehicular entity 100 or 100x travels, as illustrated by arrow 436-2, into a third location 432-3 of a third road lane portion 433-3, the proximity of the vehicular communication component 416 to the external communication component 446-3 can indicate that the vehicular entity 100 or 100x has received the service and/or has paid for the service. In one example, the exiting vehicle can be recognized based on an identification of the vehicle, a VIN number, etc. along with a vehicular digital signature. Upon receipt and/or payment, data associated with the vehicular entity 100 or 100x can be discarded, erased, cleared, etc. from a database associated with the external communication component 446-3.

While this example is described as having an external communication component at each portion of road, examples are not so limited. For example, a single external communication component can communicate with the vehicular entity 100 or 100$x$ as it travels through each location and a proximity to the external communication component can indicate which portion of the process the vehicular entity 100 or 100$x$ is going through, as described above.

In an example, the transportation service received by the vehicular entity 100 or 100$x$ can include public services such as travel through a toll gate.

In another example, the transportation services can include services without payment, such as vehicles entering and/or exiting controlled traffic zones, private controlled access (e.g., into truck hubs, taxi stations, etc.), home car garage access, reserved bus stop area (e.g., bus stop area reserved for only for a particular company or business), taxi parking and/or a waiting area for taxis, etc. In the instance where the data sent is accompanied by a signature, a vehicular entity 100 or 100$x$ can be prevented from subsequently denying that the vehicular entity 100 or 100$x$ requested the transportation service after receiving the service.

The data exchanged between the vehicular entity 100 or 100$x$ and the transportation assistance entity 433 can be performed using a number of encryption and/or decryption methods as described later.

Since the exchange of information and data may be implemented between a target vehicle and another adjacent vehicular entity or a check point or detection station that are considered external entities, even if structured as the target vehicle in terms of communication devices and components, we will now disclose how the communication system between the target vehicle and these entities may be established.

Figure 12:
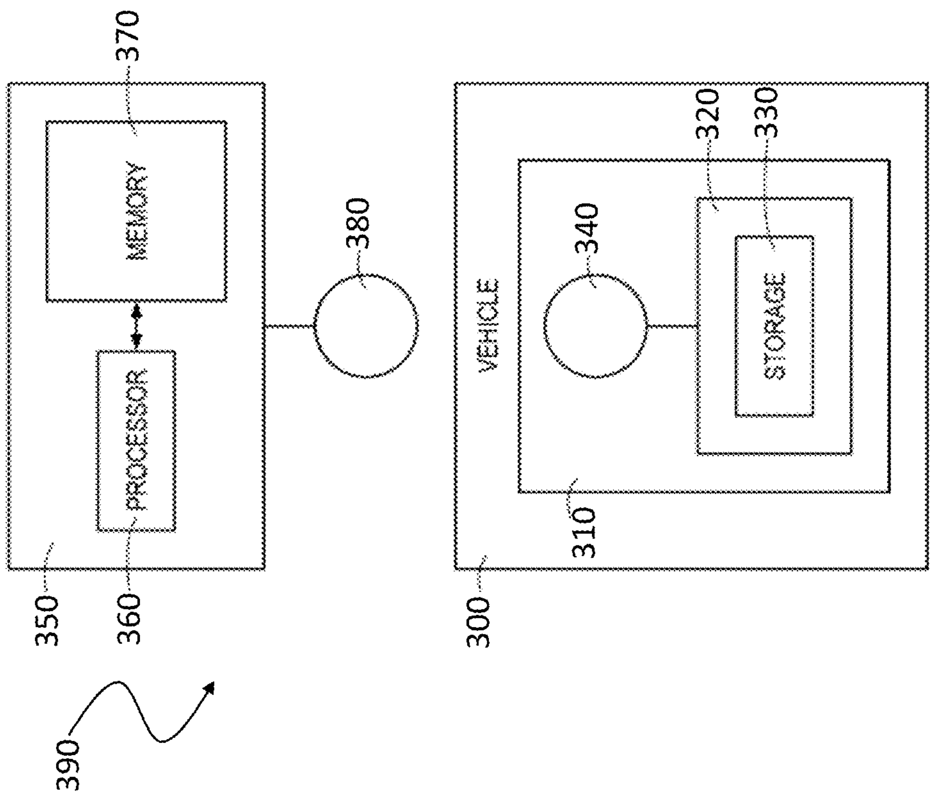
FIG. 12 is a block diagram of an example system including an external communication component and a vehicular communication component in accordance with an embodiment of the present disclosure.

FIG. 12 illustrates a communications system 390 according to an embodiment of the present disclosure. In this embodiment, the system 390 includes a passive communication component 310, such as a short-range communication device (e.g., an NFC tag but not limited thereto) that can be as described previously. The communication component 310 can be in a vehicular entity 300, which can be configured as shown in FIG. 1 for the vehicular entity 100 and include the components of vehicular entity 100 in addition to the communication component 310, which can be configured as the vehicular communication component 130. The communication component 310 includes a chip 320 having a non-volatile storage component 330 that stores information about the vehicular entity 300 as previously disclosed (such as vehicle ID, driver/passenger information, carried goods information, etc.). The communication component 310 can include an antenna 340.

The system 390 further includes a communications component 350, such as an active communications device (e.g., that includes a power supply), which can receive the information from the communication component 310 and/or can transmit information thereto. In some examples, the communication component 350 can include a reader (e.g., an NFC reader), such as a toll reader, or other components. The communication component 350 can be an external device arranged (e.g., embedded) in proximity of borders/customs or in general in proximity of limited access areas. In some embodiments, the communication component 350 can also be carried by border police.

The communication component 350 can include a processor 360, a memory 370, such as a non-volatile memory, and an antenna 380. The memory 370 can include an NFC protocol that allows the communications component 350 to communicate with the communication component 310. For example, the communication component 350 and the communication component 310 can communicate using the NFC protocol, such as at about 13.56 mega-Hertz and according to the ISO/IEC 18000-3 international standard. Clearly, also other approaches that use RFID tags are within the scope of the present invention.

The communications component 350 can also communicate with an operation center. For example, the communications component 350 can be wirelessly coupled or hardwired to a communication center. In some examples, the communications component 350 can communicate with the operation center via WIFI or over the Internet. The communications component 350 can energize the communication component 310 when the vehicular entity 300 brings antenna 340 within a communication distance of antenna 380, as described previously. In some examples, the communication component 350 can receive real-time information from the operation center and can transmit that information to vehicular entity 300. In some embodiments, also the communication component 310 can have its own battery.

The communication component 350 is therefore adapted to read/send information from/to the vehicle entity 300, which is equipped with the communication component 310 (for example a passive device) configured to allow information exchange.

Referring again to FIGS. 2 and 3, as the vehicular communication component 130 of the vehicular entity 100 approaches within a particular proximity of the external communication component 230, communication can begin and/or become strengthened. The communication distance is usually a couple of meters.

In particular, as it will be clearer in the following, the vehicular communication component 130 can send a vehicular public key to the external communication component 230 and the external communication component 230 can send an external public key to the vehicular communication component 130. These public keys (vehicular and external) can be used to encrypt data sent to each respective communication component and verify an identity of each and exchange confirmations and other information. As an example, as will be described further below in association with FIGS. 13-17, the vehicular communication component 130 can encrypt data using the received external public key and send the encrypted data to the external communication component 230. Likewise, the external communication component 230 can encrypt data using the received vehicular public key and send the encrypted data to the vehicular communication component 130. Data sent by the vehicular entity 100 can include car information, passenger's information, goods information, and the like. The information can optionally be sent with a digital signature to verify an identity of the vehicular entity 100. Moreover, information can be provided to the vehicular entity 100 and displayed on a dashboard of the vehicular entity 100 or sent to an email associated with the vehicular entity 100. The vehicle can be recognized based on an identification of the vehicle, a VIN number, etc. along with a vehicular digital signature, as it will be disclosed below.

In an example, data exchanged between the vehicular entity and the external entity can have a freshness used by the other. As an example, data sent by the vehicular entity to the external entity to indicate the exact same instructions can be altered at each of a particular time frame or for a particular amount of data being sent. This can prevent a hacker from intercepting previously sent data and sending the same data again to result in the same outcome. If the data has been slightly altered but still indicates a same instruction, the hacker would send the identical information at a later point in time and the same instruction would not be carried out due to the recipient expecting the altered data to carry out the same instruction.

The data exchanged between the vehicular entity 100 and the external entity 200 can be performed using a number of encryption and/or decryption methods as described below. The securing of the data can insure that nefarious activity is prevented from interfering with the operation the vehicular entity 100 and the external entity 200.

Figure 13:
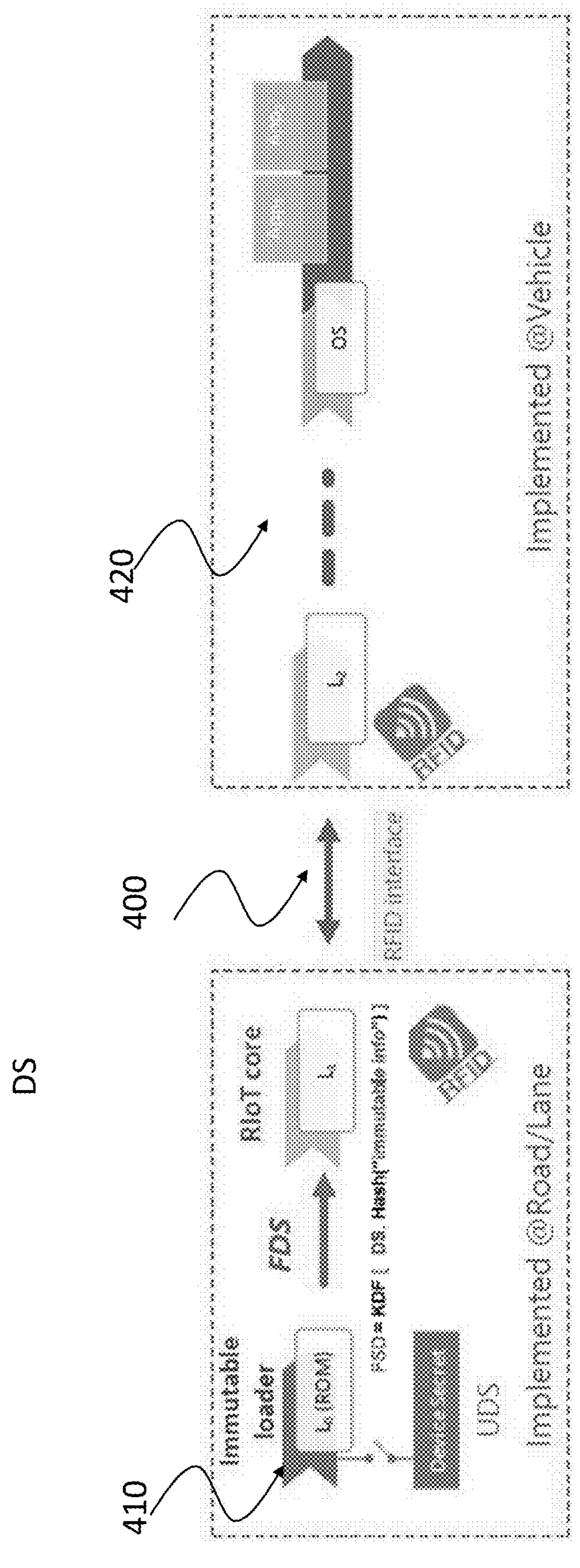
FIG. 13 is a block diagram of an example process to determine a number of parameters in accordance with an embodiment of the present disclosure.

FIG. 13 is a block diagram of an example system including an external communication component 410 and a vehicular communication component 420 in accordance with an embodiment of the present disclosure. As the vehicular entity comes near the external entity, the associated vehicular communication component 420 of the vehicular entity can exchange data with the external entity as described above for example using a sensor (e.g., a radio frequency identification sensor, or RFID, or the like).

According to a communication protocol described in the present disclosure, i.e. the so-called DICE-RIoT protocol, a computing device can boot in stages using layers, with each layer authenticating and loading a subsequent layer and providing increasingly sophisticated runtime services at each layer. A layer can thus be served by a prior layer and serve a subsequent layer, thereby creating an interconnected web of the layers that builds upon lower layers and serves higher order layers. Of course, although the DICE-RIoT protocol has been described in details, other protocols could be adopted.

In a typical implementation of the preferred communication protocol, security of the communication protocol is based on a secret value called "device secret", DS, that is set during manufacture (or also later). The device secret DS exists within the device on which it was provisioned. The device secret DS is accessible to the first stage ROM-based boot loader at boot time. The system then provides a mechanism rendering the device secret inaccessible until the next boot cycle, and only the boot loader (i.e. the boot layer) can ever access the device secret DS. Therefore, in this approach, the boot is layered in a specific architecture and all begins with the device secret DS.

As is illustrated in FIG. 13, Layer 0, $L_0$, and Layer 1, $L_1$, are within the external communication component 410. Layer 0 $L_0$ can provide a Firmware Derivative Secret, FDS, key to Layer 1 $L_1$. The FDS key can describe the identity of code of Layer 1 $L_1$ and other security relevant data. A particular protocol (such as robust internet of things (RIoT) core protocol) can use the FDS to validate code of Layer 1 $L_1$ that it loads. In an example, the particular protocol can include a device identification composition engine (DICE) and/or the RIoT core protocol. As an example, the FDS can include Layer 1 $L_1$ firmware image itself, a manifest that cryptographically identifies authorized Layer 1 $L_1$ firmware, a firmware version number of signed firmware in the context of a secure boot implementation, and/or security-critical configuration settings for the device. The device secret DS can be used to create the FDS and is stored in the memory of the external communication component. Therefore, the Layer 0 $L_0$ never reveals the actual device secret DS and it provides a derived key (i.e. the FDS key) to the next layer in the boot chain.

The external communication component 410 is adapted to transmit data, as illustrated by arrow 400, to the vehicular communication component 420. The transmitted data can include an external identification that is public, a certificate (e.g., an external identification certificate), and/or an external public key, as it will be illustrated in connection with FIG. 14. Layer 2 $L_2$ of the vehicular communication component 420 can receive the transmitted data, execute the data in operations of the operating system, OS, for example on a first application $App_1$ and a second application $App_2$.

Likewise, the vehicular communication component 420 can transmit data, as illustrated by arrow 400, including a vehicular identification that is public, a certificate (e.g., a vehicular identification certificate), and/or a vehicular public key, as it will be illustrated in connection with FIG. 15. As an example, after the authentication (e.g., after verifying certificate), the vehicular communication component 420 can send a vehicle identification number, VIN, for further authentication, identification, and/or verification of the vehicular entity, as it will be explained in the following.

Figure 14:
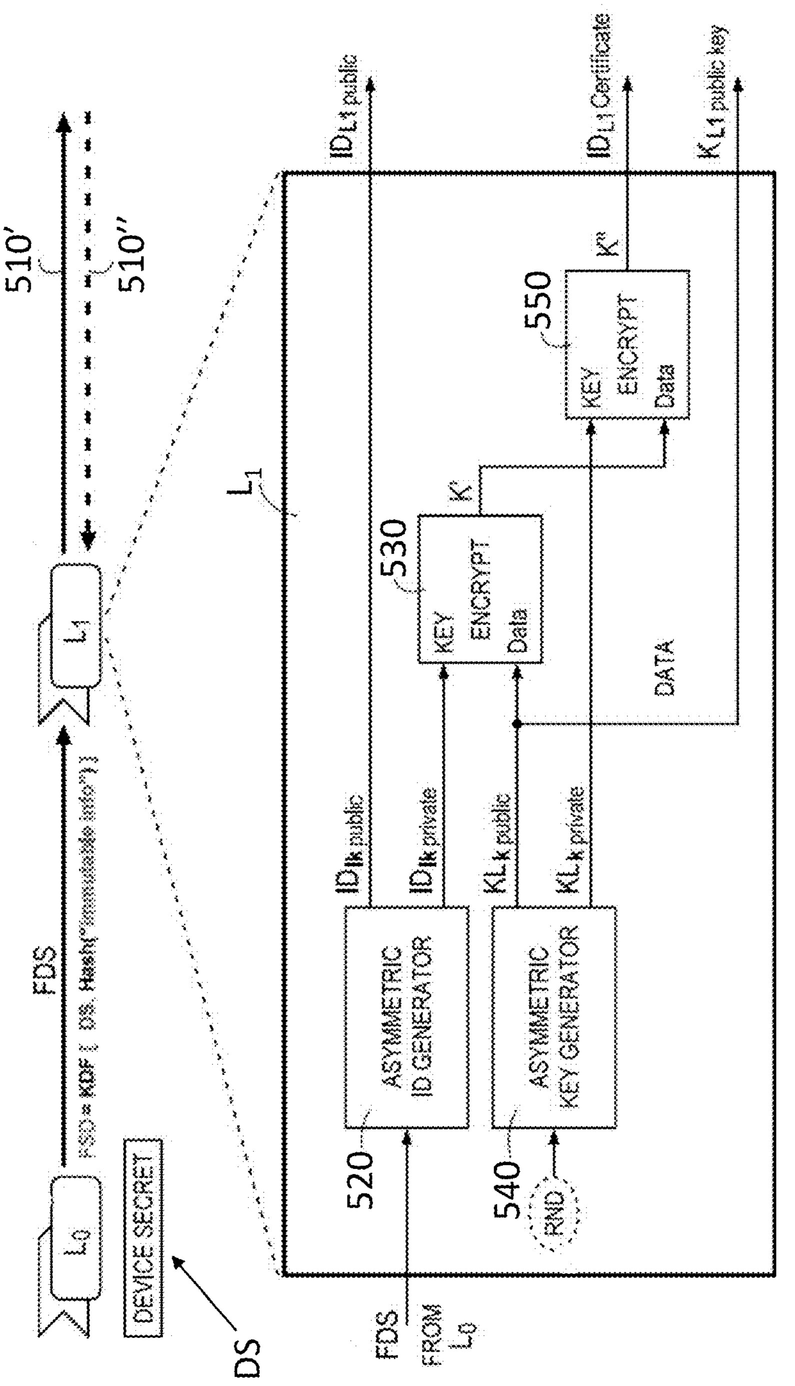
FIG. 14 is a block diagram of an example process to determine a first group of parameters in accordance with an embodiment of the present disclosure.

As shown in FIGS. 13 and 14, in an example operation, the external communication component 410 can read the device secret DS, hash an identity of Layer 1 $L_1$, and perform the following calculation:

$$FDS=KDF[DS,\ \text{Hash ("immutable information")}]$$

where KDF is a cryptographic one-way key derivation function (e.g., HMAC-SHA256). In the above calculation, Hash can be any cryptographic primitive, such as SHA256, MD5, SHA3, etc.

In at least one example, the vehicular entity can communicate using either of an anonymous log in or an authenticated log in. The authenticated log in can allow the vehicular entity to obtain additional information that may not be accessible when communicating in an anonymous mode. In at least one example, the authentication can include providing the vehicular identification number VIN and/or authentication information, such as an exchange of public keys, as will be described below. In either of the anonymous and authenticated modes, the external entity (such as the border police) can communicate with the vehicular entity to provide the external public key associated with the external entity to the vehicular entity.

FIG. 14 is a block diagram of an example process to determine parameters, in particular within the Layer $L_1$, of the external device, according to an embodiment of the present disclosure. More in particular, this is an example of a determination of the parameters including the external public identification, the external certificate, and the external public key that are then sent (as indicated by arrow 510') to Layer 2 $L_2$ of the vehicular communication component (e.g., reference 420 in FIG. 13). Arrows 510' and 510" of FIG. 14 correspond to the bidirectional arrow 400 of FIG. 13. Obviously, the layers in FIG. 14 correspond to the layers of FIG. 13.

As shown in FIG. 14, the FDS from Layer 0 $L_0$ is sent to Layer 1 $L_1$ and used by an asymmetric ID generator 520 to generate a public identification, IDlkpublic, and a private identification, IDlkprivate. In the abbreviated "IDlkpublic" the "lk" indicates a generic Layer k (in this example Layer 1 $L_1$), and the "public" indicates that the identification is openly shared. The public identification IDlkpublic is illustrated as shared by the arrow extending to the right and outside of Layer 1 $L_1$ of the external communication component. The generated private identification IDlkprivate is used as a key input into an encryption entity 530. The encryption entity 530 can be any processor, computing device, etc. used to encrypt data.

Layer 1 $L_1$ of the external communication component can include an asymmetric key generator 540. In at least one example, a random number generator, RND, can optionally input a random number into the asymmetric key generator 540. The asymmetric key generator 540 can generate a public key, KLkpublic, (referred to as an external public key) and a private key, KLkprivate, (referred to as an external private key) associated with an external communication component such as the external communication component 410 in FIG. 13. The external public key KLkpublic can be an input (as "data") into the encryption entity 530. The encryptor 530 can generate a result K' using the inputs of the external private identification IDlkprivate and the external public key KLkpublic. The external private key KLkprivate and the result K' can be input into an additional encryption entity 550, resulting in output K". The output K" is the external certificate, IDL1certificate, transmitted to the Layer 2 $L_2$. The external certificate IDL1certificate can provide an ability to verify and/or authenticate an origin of data sent from a device. As an example, data sent from the external communication component can be associated with an identity of the external communication component by verifying the certificate, as it will be described further in association with FIG. 16. Further, the external public key KL1public key can be transmitted to Layer 2 $L_2$. Therefore, the public identification IDl1public, the certificate IDL1certificate, and the external public key KL1public key of the external communication component can be transmitted to Layer 2 $L_2$ of the vehicular communication component.

Figure 15:
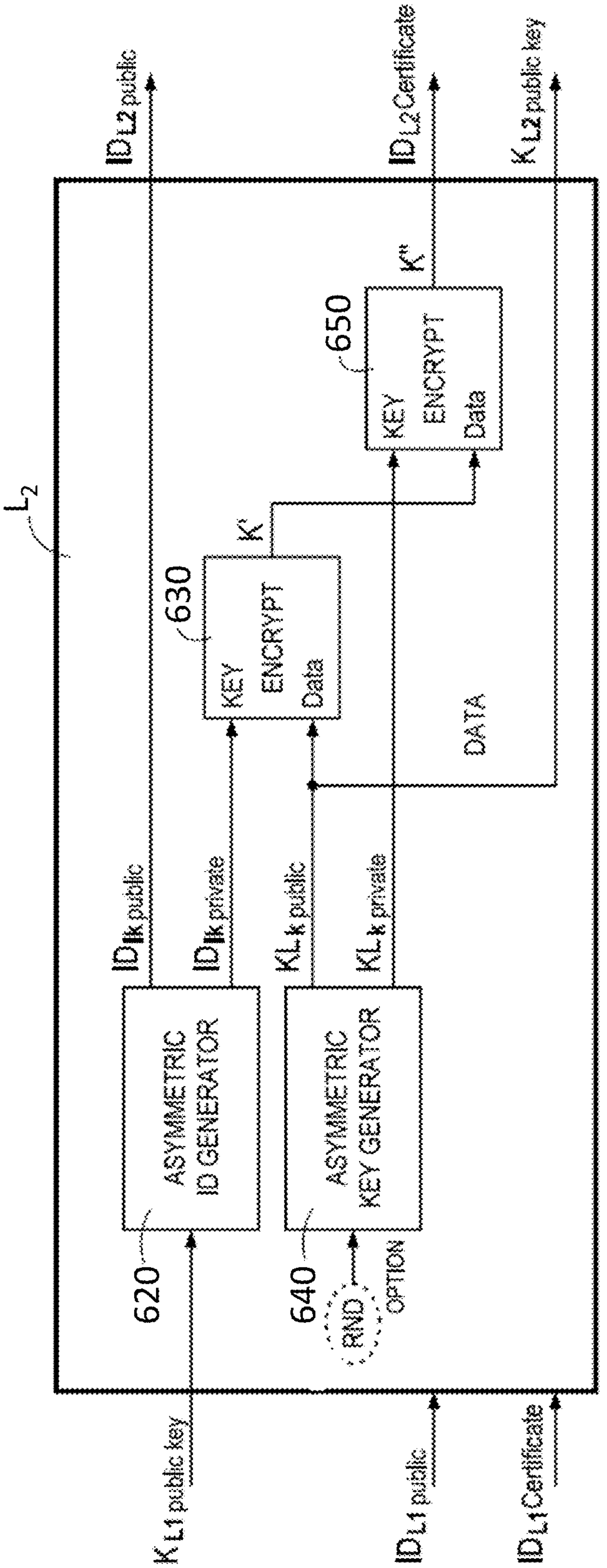
FIG. 15 is a block diagram of an example process to determine a second group of parameters in accordance with an embodiment of the present disclosure.
Figure 16:
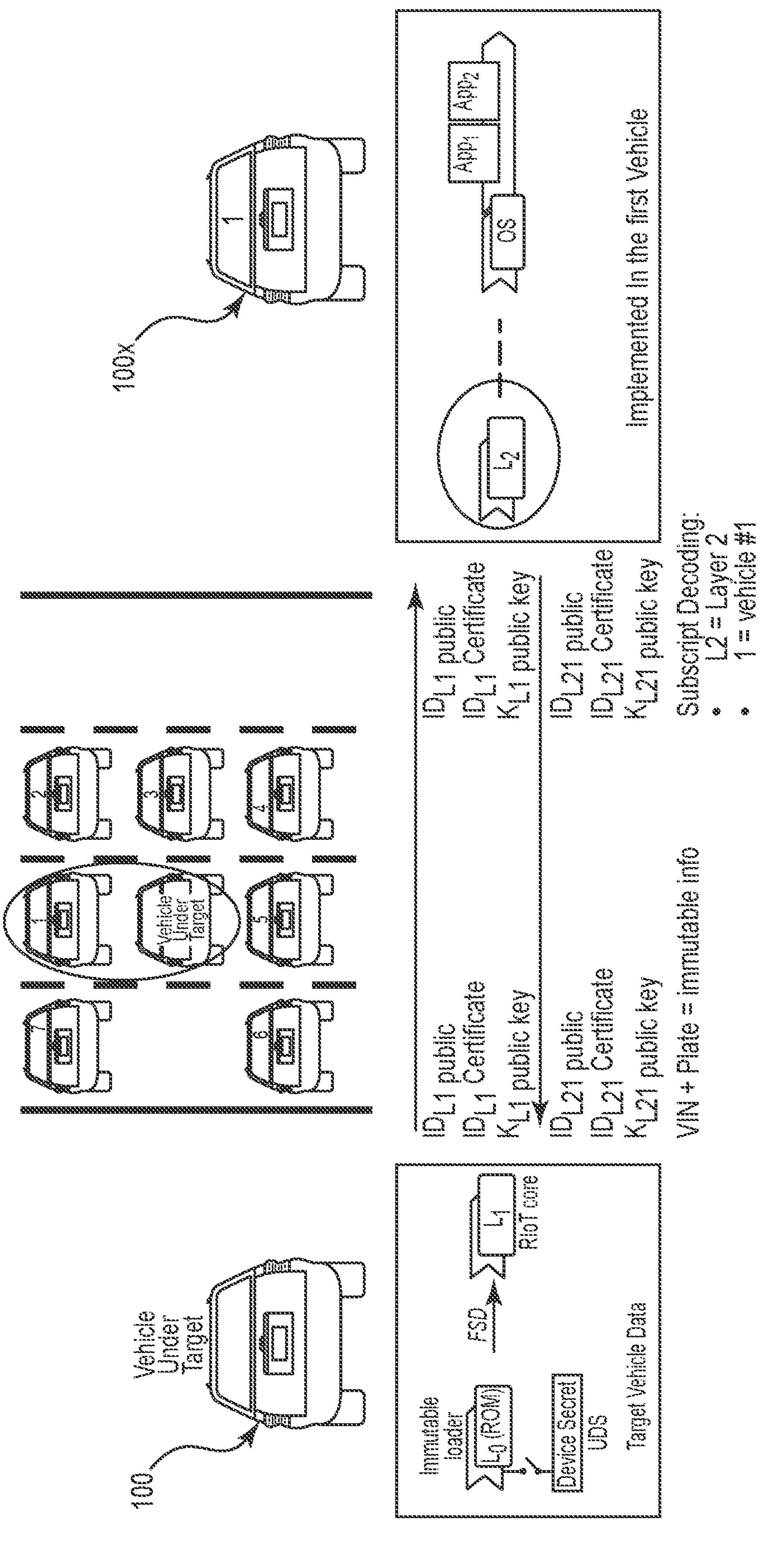
FIG. 16 is schematic view of an application example of the authentication process of the present disclosure applied to the vehicle configuration of FIG. 1.

FIG. 15 is a block diagram of an example process to determine a number of parameters, in particular within the Layer $L_2$ of the vehicular communication component, in accordance with an embodiment of the present disclosure. More in particular, FIG. 16 illustrates the Layer 2 $L_2$ of the vehicular communication component generating a vehicular identification, IDL2public, a vehicular certificate, IDL2certificate, and a vehicular public key, KL2public key.

In particular, as shown in FIG. 15, the external public key KL1public key transmitted from Layer 1 $L_1$ of the external communication component to Layer 2 $L_2$ of the vehicular communication component, as described in FIG. 14, is used by an asymmetric ID generator 620 of the vehicular communication component to generate a public identification IDlkpublic and a private identification IDlkprivate of the vehicular communication component. In the abbreviated "IDlkpublic" the "lk" indicates Layer k (in this example Layer 2), and the "public" indicates that the identification is openly shared. The public identification IDlkpublic is illustrated as shared by the arrow extending to the right and outside Layer 2 $L_2$. The generated private identification IDlkprivate is used as a key input into an encryption entity 630.

Layer 2 $L_2$ of the vehicular communication component also includes an asymmetric key generator 640. In at least one example, a random number generator, RND, can optionally input a random number into the asymmetric key generator 640. The asymmetric key generator 640 can generate a public key KLkpublic (referred to as a vehicular public key) and a private key KLkprivate (referred to as a vehicular private key) associated with a vehicular communication component such as the vehicular communication component 420 in FIG. 13. The vehicular public key KLkpublic can be an input (as "data") into the encryptor 630. The encryption entity 630 can generate a result K' using the inputs of the vehicular private identification IDlkprivate and the vehicular public key KLkpublic. The vehicular private key KLkprivate and the result K' can be input into an additional encryptor 650, resulting in output K". The output K" is the vehicular certificate IDL2certificate transmitted back to the Layer 1 $L_1$ of FIGS. 13 and 14. The vehicular certificate IDL2certificate can provide an ability to verify and/or authenticate an origin of data sent from a device.

As an example, data sent from the vehicular communication component can be associated with an identity of the vehicular communication component by verifying the certificate, as will be described further in association with FIG. 16. Further, the vehicular public key KL2public key can be transmitted to Layer 1 $L_1$. Therefore, the public identification IDL2public, the certificate IDL2certificate, and the vehicular public key KL2public key of the vehicular communication component can be transmitted to Layer 1 $L_1$ of the external communication component.

In an example, in response to the external communication component receiving a public key from the vehicular communication component, the external communication component can encrypt data to be sent to the vehicular communication component using the vehicular public key. Vice versa, the vehicular communication component can encrypt data to be sent to the external communication component using the external public key. In response to the vehicular communication component receiving data encrypted using the vehicular public key, the vehicular communication component can decrypt the data using its own vehicular private key. Likewise, in response to the external communication component receiving data encrypted using the external public key, the external communication component can decrypt the data using its own external private key. As the vehicular private key is not shared with another device outside the vehicular communication component and the external private key is not shared with another device outside the external communication component, the data sent to the vehicular communication component and to the external communication component remains secure.

If we should apply the authentication method disclosed with reference to FIGS. 13 to 15 to the target vehicle 100, for instance in the configuration of FIG. 8, we would obtain the example of FIG. 16 wherein the Layer $L_2$ of vehicular communication component is taken from the first vehicle 100*x*-1 proceeding the target vehicle 100 in lane A2.

Figure 17:
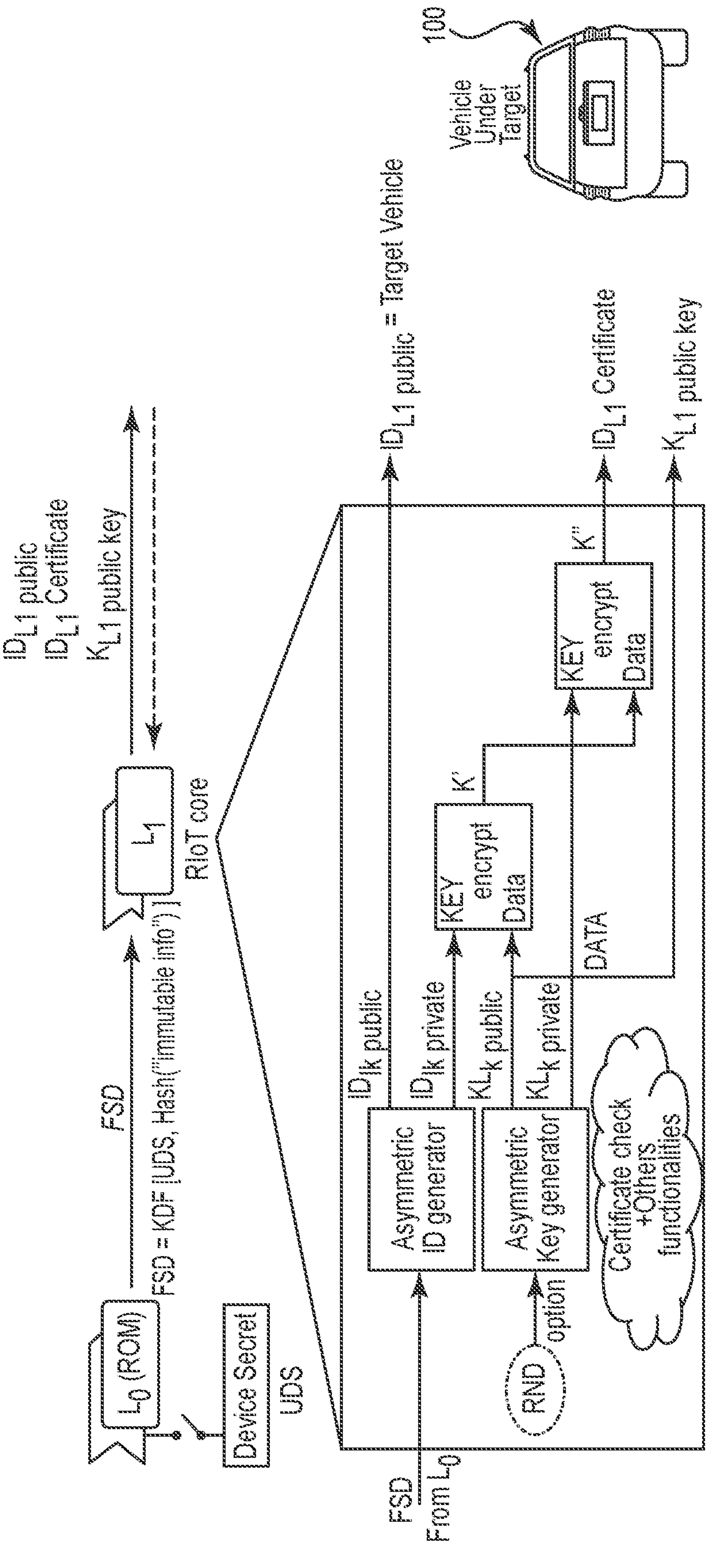
FIGS. 17 and 18 are schematic views of the application of the process of FIGS. 14 and 15 to the vehicle configuration of FIG. 8.

The result is shown in the schematic view of FIG. 17 and corresponding labels wherein certificates IDL1, IDL1 of the target vehicle and the KL1 public key are obtained according to the (DICE)-robust internet of thing (RIoT) protocol.

Figure 18:
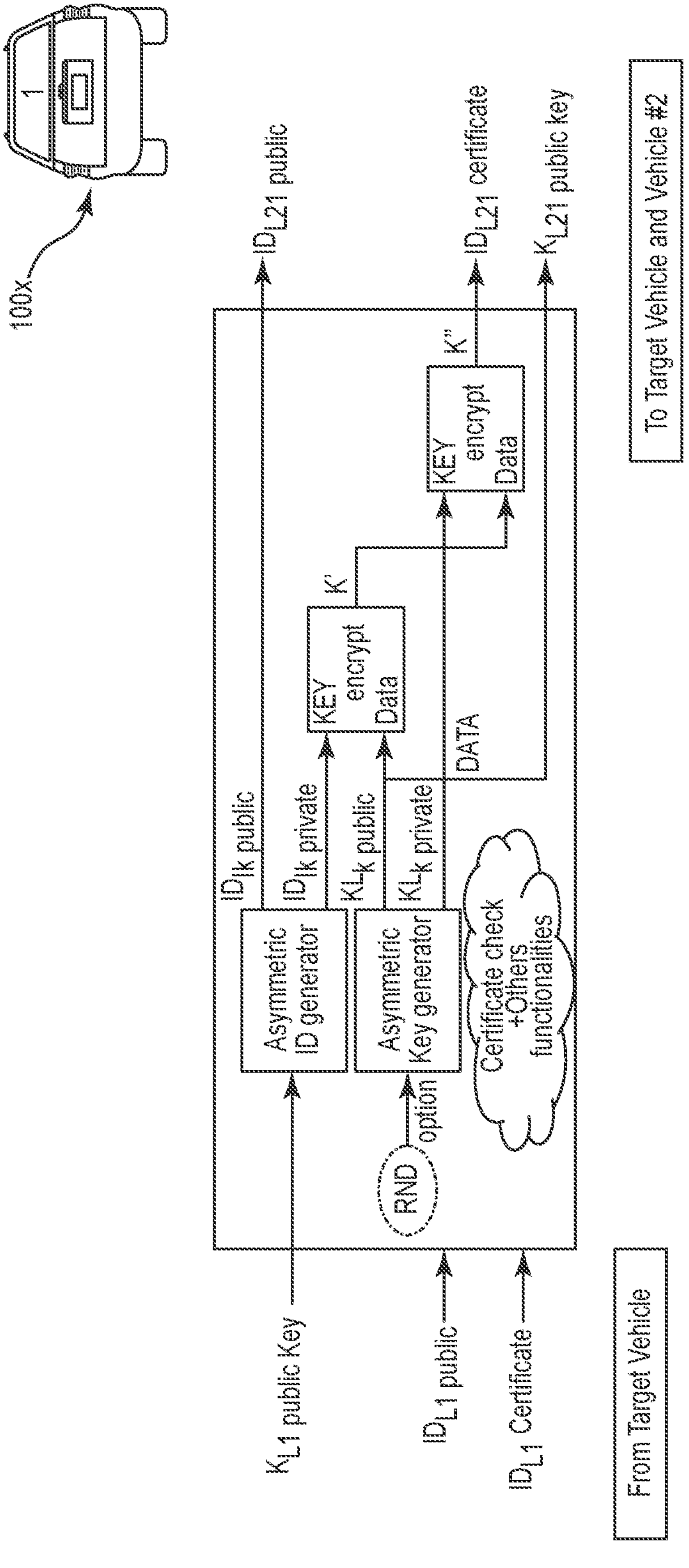

Similarly, in FIG. 18 it is shown a schematic view of the application of the above method and protocol for obtaining the certificate IDL2x, IDL2x of the other vehicle, in this case the first vehicle 100*x*-1, and its public key KL2x. This procedure is applied to any other vehicle 100*x*-2, . . . , 100*x*-8 surrounding the target vehicle 100.

Figure 19:
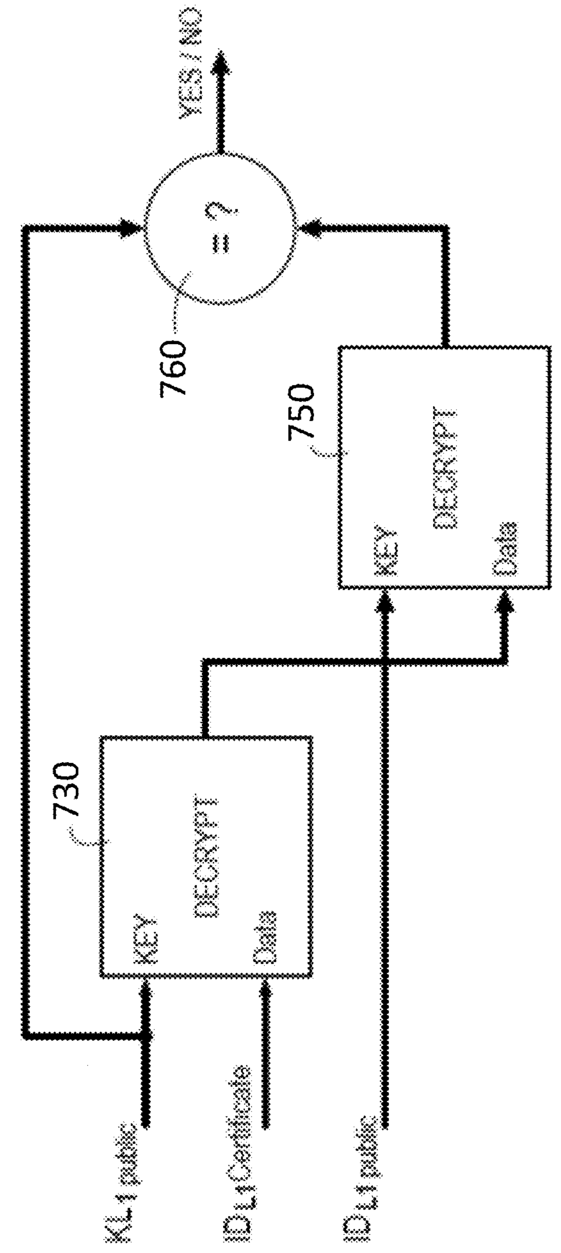
FIG. 19 is a block diagram of an example process to verify a certificate in accordance with an embodiment of the present disclosure.

FIG. 19 is a block diagram of an example process to verify a certificate in accordance with an embodiment of the present disclosure. In the illustrated example of FIG. 19, a public key KL1public, a certificate IDL1certificate, and a public identification IDL1public is provided from the external communication component (e.g., from Layer 1 $L_1$ of the external communication component 410 in FIG. 13). The data of the certificate IDL1certificate and the external public key KL1public can be used as inputs into a decrypting device 730. The decrypting device 730 can be any processor, computing device, etc. used to decrypt data. The result of the decryption of the certificate IDL1certificate and the external public key KL1public can be used as an input into a secondary decrypting device 750 along with the public identification IDL1public, resulting in an output. The external public key KL1public and the output from the decrypting device 750 can indicate, as illustrated at block 760, whether the certificate is verified, resulting in a yes or no as an output. Private keys are associated univocally with single layers and a specific certificate can only be generated by a specific layer. In response to the certificate being verified (i.e. after the authentication), data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 20:
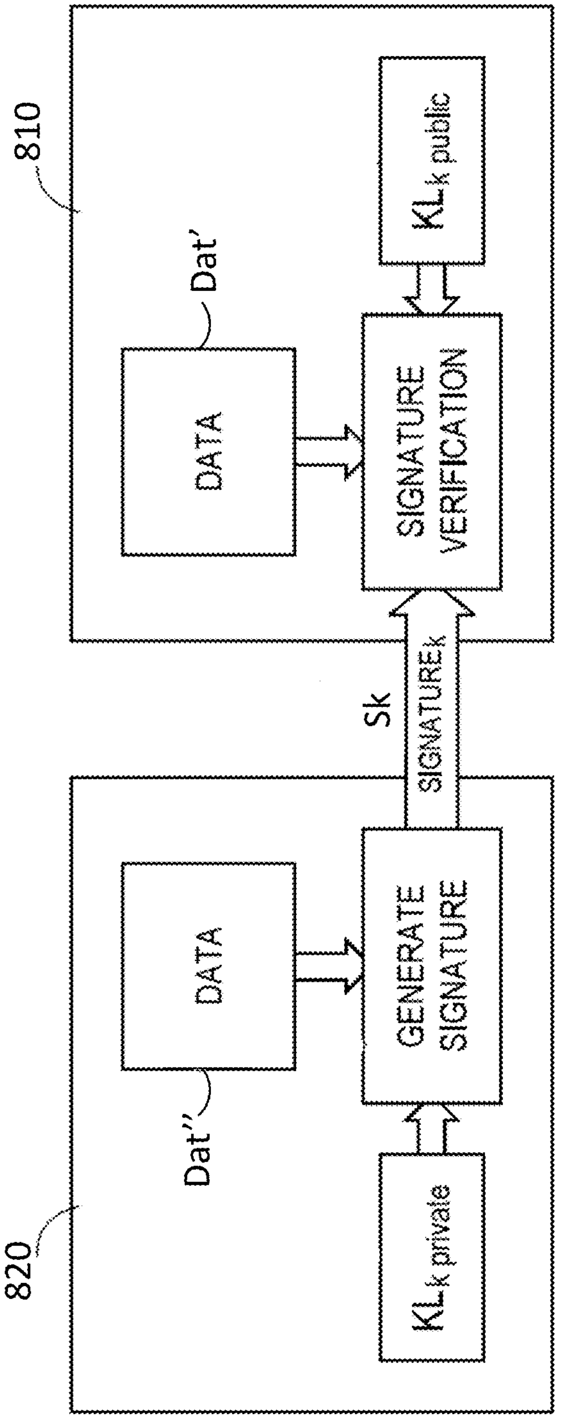
FIG. 20 is a block diagram of an example process to verify a signature in accordance with an embodiment of the present disclosure.

FIG. 20 is a block diagram of an example optional process to verify a signature in accordance with an embodiment of the present disclosure. In the instance where a device is sending data that may be verified in order to avoid subsequent repudiation, a signature can be generated and sent with the data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A vehicle computing device 820 (such as vehicle computing device 110 in FIG. 2) can send data Dat" to an external computing device 810 (such as external computing device 210 of FIG. 3). The vehicle computing device 820 can generate a signature Sk using the vehicular private key KLkprivate. The signature Sk can be transmitted to the external computing device 810. The external computing device 810 can verify using data Dat' and the public key KLkpublic previously received (i.e. the vehicular public key). In this way, signature verification operates by using a private key to encrypt the signature and a public key to decrypt the signature.

In this way, a unique signature for each device can remain private to the device sending the signature while allowing the receiving device to be able to decrypt the signature for verification. This is in contrast to encryption/decryption of the data, which is encrypted by the sending device using the public key of the receiving device and decrypted by the receiving device using the private key of the receiver. In at least one example, the vehicle can verify the digital signature by using an internal cryptography process (e.g., Elliptical Curve Digital signature (ECDSA) or a similar process.

Thanks to the exchange and verification of the certificates and of the public keys, the devices are able to communicate in a secure way with each other. When a vehicle entity approaches an external entity (such as border security entity or, generally, an electronically controlled limited access gate), the respective communication devices (which have the capability shown in FIG. 16 of verifying the respective certificate) exchange the certificates and communicate to each other. After the authentication (e.g. after receiving/verifying from the external entity the certificate and the public key), the vehicle entity is thus able to communicate all the needed information related thereto and stored in the memory thereof, such as plate number/ID, VIN, insurance number, driver info (IDs, eventual permission for border transition), passengers info, transported goods info and the like. Then, after checking the received info, the external entity communicates to the vehicle the result of the transition request, this info being possibly encrypted using the public key of the receiver.

The exchanged messages/info can be encrypted/decrypted using the above-described DICE-RIoT protocol. In some embodiments, the so-called immutable data (such as plate number/ID, VIN, insurance number) is usually not encrypted, while other sensible info is encrypted. In other words, in the exchanged message, there can be not-encrypted data as well as encrypted data: the info can thus be encrypted or not or mixed. The correctness of the message is then ensured by using the certificate/public key to validate that the content of the message is valid.

When applying the authentication procedure of the present disclosure to the schematic matrix of vehicle shown in FIG. 1 we obtain a corresponding matrix of exchanged information and data as shown in FIG. 21 wherein the circled central cell represents the data of the target vehicle 100.

Figure 9B:
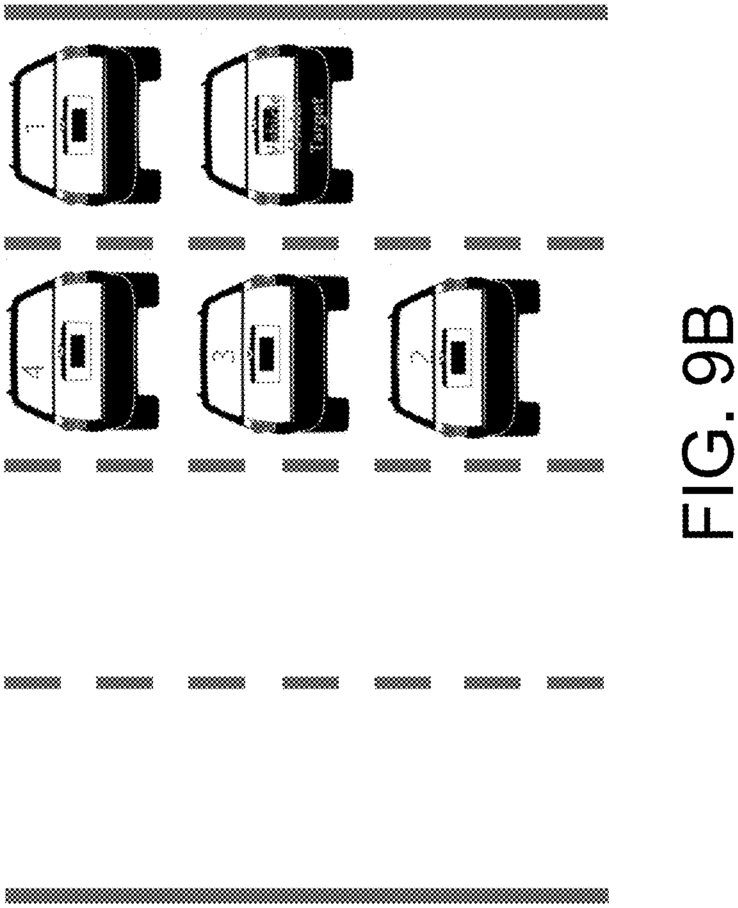
FIG. 9B illustrates another example of a transportation environment wherein a target vehicle is surrounded by autonomous driving vehicles and/or other vehicular entities within a secure channel area.
Figure 22:
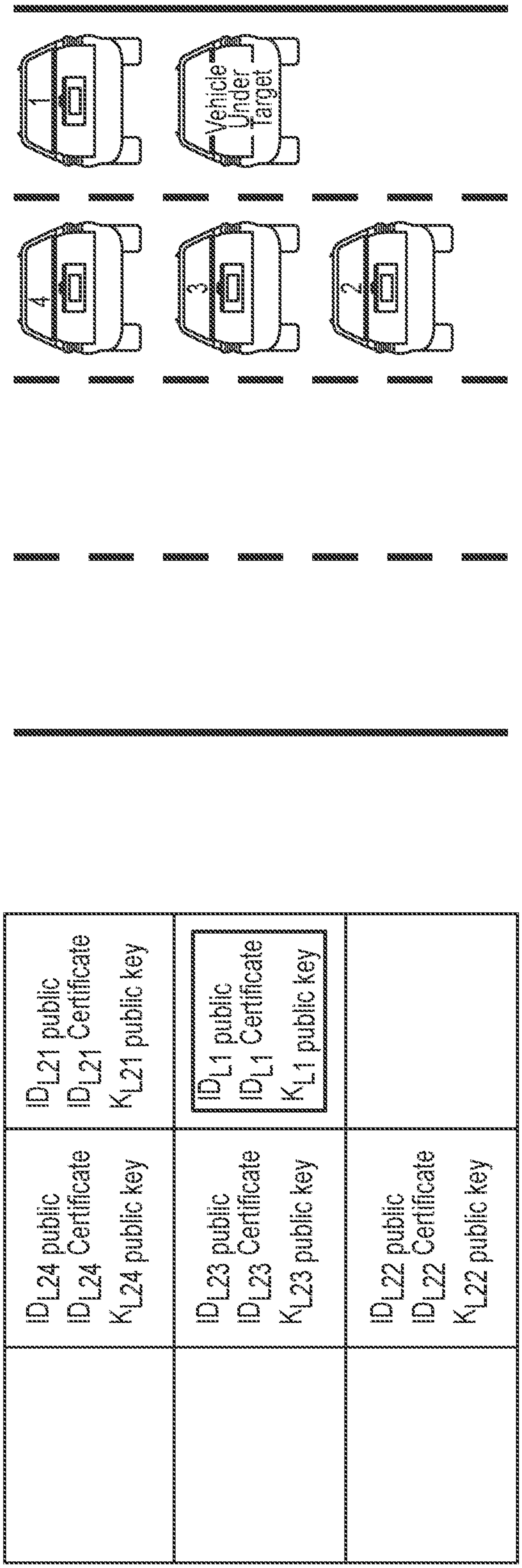
FIG. 22 is a schematic view of a correspondence between the vehicle configuration of FIG. 9B with a matrix of information and data exchanged between a target vehicle and the vehicular entities surrounding it on parallel lanes.

Just to show an alternative example, FIG. 22 reports the authentication procedure of the present disclosure applied to the schematic matrix of vehicle shown in FIG. 9B and the resulting corresponding matrix of exchanged information and data.

Figure 23:
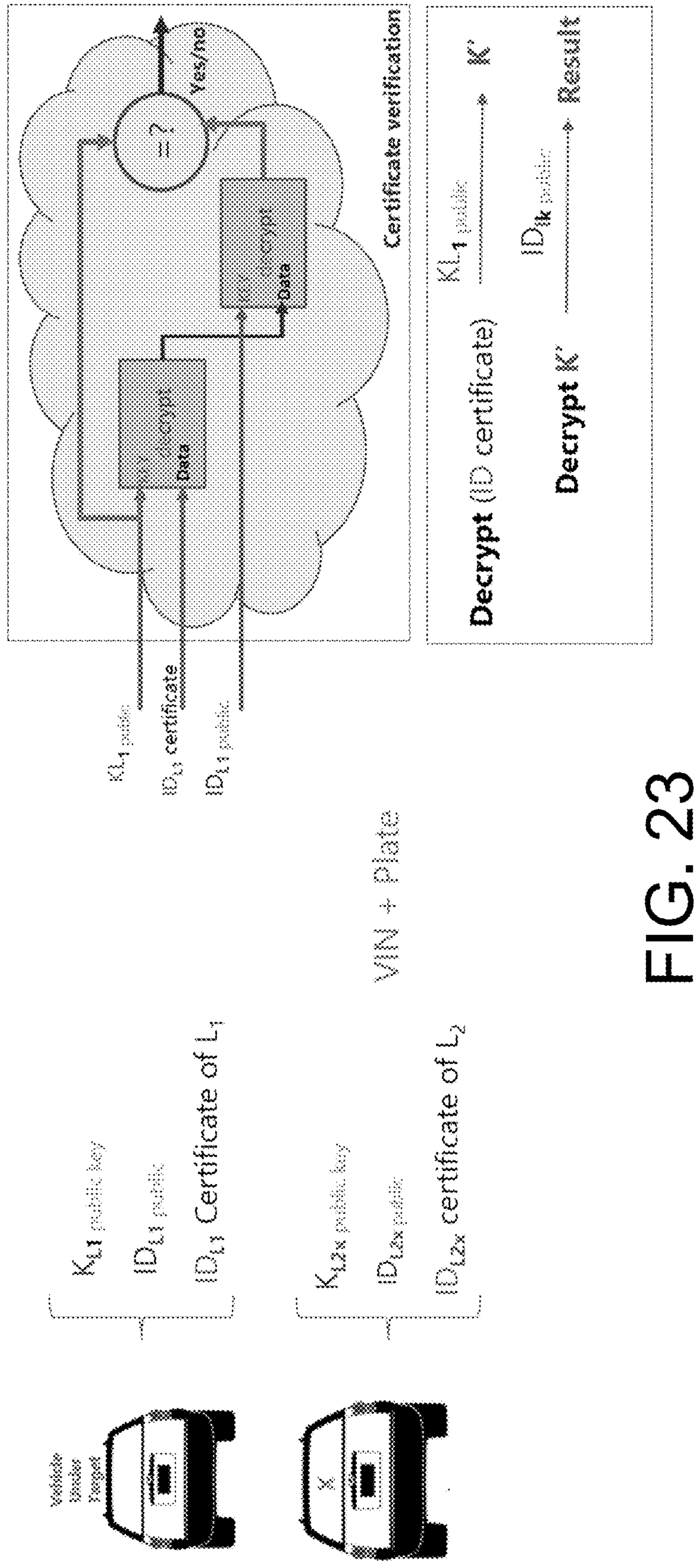
FIG. 23 is a schematic view illustrating the application of the certificate verification process applied to the target vehicle and to an adjacent vehicular entity.

FIG. 23 is a schematic view illustrating the application of the certificate verification process applied to the target vehicle and to an adjacent vehicular entity.

Figure 24:
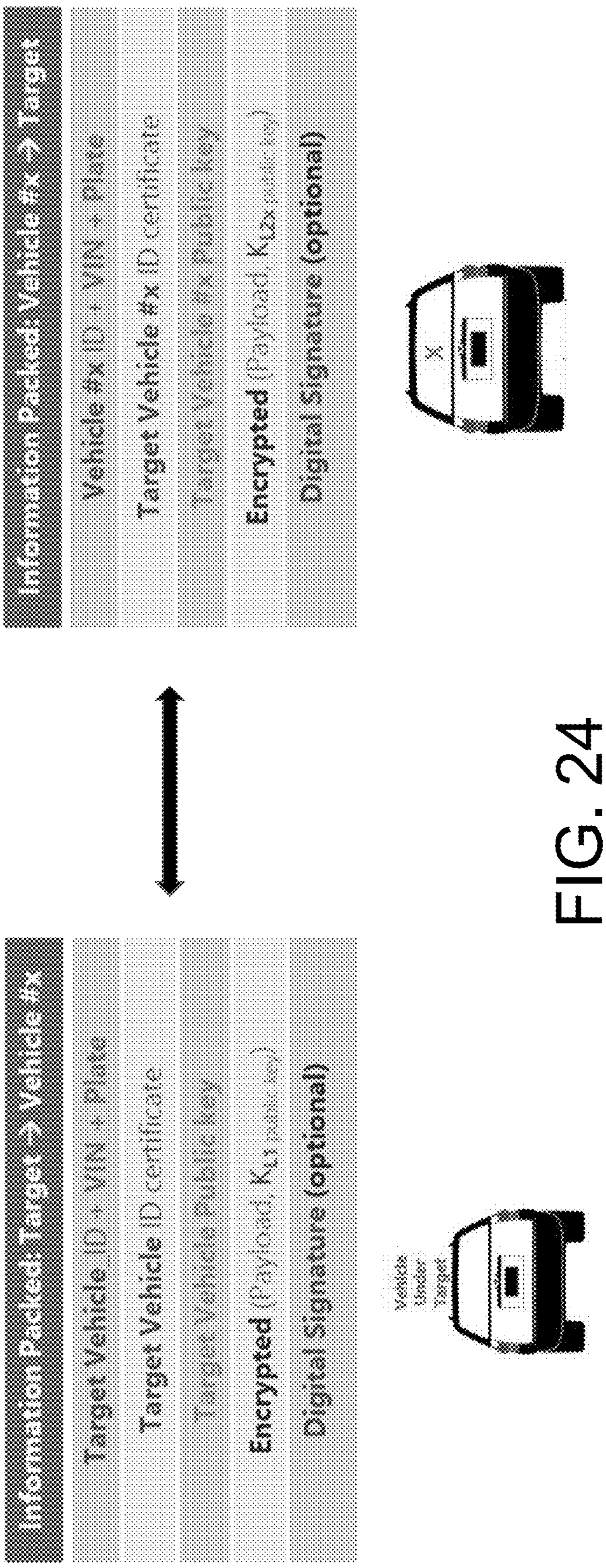
FIG. 24 shows an example of secure communication between a target vehicle and another adjacent travelling vehicular entity according to an embodiment of the present disclosure.

For completeness sake FIG. 24 illustrates the information packed and exchanged between the vehicle entity and the external entity, i.e. the exchanged message content. In particular, the target vehicle 100 sends to the external entity 100*x-i*, in addition to the certificate, all the related info, such as the immutable info and other info stored that can be encrypted using the external public key, together with the vehicular public key, such info being then decrypted by using the private key of the receiver.

Optionally, the sender can sign the whole packed message by using its private key and the receiver can verify the signature by using the public key of sender. On the other hand, the packed message sent by the external vehicular entity 100*x-i* includes, in addition to the certificate and to the external public key (which can be sent in first step), the info (which can be encrypted using the vehicular public key) which are related to permission/authorization to pass through the border/limited access area, i.e. the vehicular entity 100*x-i* communicates the result of the transition request. Therefore, according to the present disclosure, the processor of the target vehicle may automatically regulate the departure and travelling that is authorized on the basis of the decrypted received data. As previously mentioned, the DICE-RIoT protocol may be adopted to perform the communication between the vehicle entity and the vehicular entity 100*x-i* as external entity.

The target vehicle 100 can energize the respective wireless communication devices when it comes within the communication distance of the respective wireless communication devices. For example, vehicle 100 can energize the wireless communication devices of the surrounding vehicles 100*x-i* when it gets close to those wireless communication devices or close to fixed and passive wireless communication devices installed along the lanes of the route 50. We can call those passive wireless communication devises as markers.

The energized wireless passive communication devices can send a message to the target vehicle indicating that vehicle is close to the respective lane marker.

In some examples, the communication distance is such that the target vehicle 100 energizes one pair of wireless communication devices at a time, such as across a common location along road 50. For example, the pair can include one wireless communication device from the left side of the lane and one wireless communication device from the right side of the lane.

In some examples, the wireless communication devices of a particular set can include the same route information. For example, wireless communication devices can include the same route information. Additionally, corresponding sets on the left and right sides of the lane, such as the set of wireless communication devices and the corresponding set of wireless communication devices can include the same route information. However, different sets on the same side can include different information.

In some examples, the respective communication devices of the left and right sides of a lane A1, A2, A3 or A4 can be respectively at common locations along the road 50. The respective left and right communication devices can respectively include the same information. As an alternative, however, the respective left and right communication devices can include different information.

The route information in a set of wireless communication devices and the corresponding set of wireless communication devices can indicate that the road is straight. The route information in the left set of wireless communication devices and the corresponding right set of wireless communication devices can indicate that the road is about to curve, there is an upcoming lane change or a detour, or the like.

Wireless left communication devices and wireless right communication devices can be distributed across lanes in a direction transverse to the direction of lane and transverse to the direction in which the target vehicle 100 is traveling. Left and right wireless communication devices can include the same information as each other.

Wireless passive communication devices can be located just before respective crossroads that cross (e.g., intersect) road 50. For example, left and right wireless communication devices can indicate that the respective crossroads are upcoming and/or can indicate the respective distances to the respective crossroads. Wireless communication devices can even be embedded in lanes.

Passive wireless communication devices can be located before a railroad crossing and can indicate that the railroad crossing is upcoming and/or can indicate the distance to the railroad crossing. In some examples, wireless communication devices can be located in a traffic light and/or a traffic sign. In some examples, wireless communication devices can be respectively on different pedestrians in a crosswalk across road.

Wireless communication devices can be used to collect information, such as traffic information for the lanes of the road 50. Vehicle 100 can write information, such as the information and data previously described in conjunction with the target vehicle 100, to wireless communication devices when vehicle 100 passes and thus energizes the passive communication devices. A number of vehicles can write information to wireless communication devices. For example, as described previously, traffic patterns, such as vehicle speeds in lane and/or the number of vehicles traveling in lane (e.g., at particular times on particular dates) can be deduced from such information. Such information can be correlated with the weather, road construction, accidents, or the like.

In the preceding detailed description, reference is made to the accompanying drawings that form a part hereof, and in which is shown, by way of illustration, specific examples. In the drawings, like numerals describe substantially similar components throughout the several views. Other examples may be utilized, and structural, logical and/or electrical changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense.

As used herein, "a number of" something can refer to one or more of such things. A "plurality" of something intends two or more. As used herein, the term "coupled" may include electrically coupled, directly coupled, and/or directly connected with no intervening elements (e.g., by direct physical contact) or indirectly coupled and/or connected with intervening elements. The term coupled may further include two or more elements that co-operate or interact with each other (e.g., as in a cause and effect relationship).

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

The invention claimed is:

1. An apparatus, comprising:

a processor;

a communication device coupled to the processor and structured to define a secure area around a vehicular entity, wherein:

the secure area is variable in shape, and the communication device exchanges information with communication devices of other vehicular entities entering the secure area to regulate travel of the vehicular entity based at least in part on the exchanged information; and a memory associated with the processor and configured to store the exchanged information, wherein the processor processes information stored in a memory of an approaching vehicular entity within the secure area on the basis of an authorization in the exchanged information.

2. The apparatus of claim 1, wherein the secure area comprises a secure channel area around the vehicular entity.

3. The apparatus of claim 1, wherein the secure area comprises a secure communication area around the vehicular entity.

4. The apparatus of claim 1, wherein the travel of the vehicular entity includes a lane departure involving the vehicular entity.

5. The apparatus of claim 1, wherein the communication device is further configured to exchange information with fixed passive wireless communication devices located along a route of the vehicular entity and powered by the vehicular entity.

6. The apparatus of claim 1, wherein the processor is configured to:

generate an external private key and an external public key;

provide the external public key to an external communication device of another vehicular entity;

receive data from the external communication device of the other vehicular entity in response to providing the external public key thereto; and decrypt the received data using the external private key.

7. The apparatus of claim 1, wherein the variable shape is based on a number of the other vehicular entities around the vehicular entity.

8. The apparatus of claim 1, wherein the exchanged information includes at least a position, a speed and braking distance, a braking time, vehicle identification data, a license plate number, or any combination thereof, of the other vehicular entities around the vehicular entity.

9. The apparatus of claim 1, wherein the processor is configured to perform encrypting phases or decrypting phases, or both, on the exchanged information using a device identification composition engine (DICE) robust internet of things (RIoT) protocol.

10. The apparatus of claim 1, wherein the processor is configured to adjust operating parameters of the vehicular entity including a speed and a braking time based on the exchanged information.

11. An apparatus, comprising:

a communication device;

a processor; and a memory configured to store instructions, which, when executed by the processor, cause the processor to:

cause the communication device to define a secure area around a vehicular entity, wherein:

the secure area is variable in shape, and the communication device exchanges information with communication devices of other vehicular entities entering the secure area to regulate travel of the vehicular entity based at least in part on the exchanged information;

cause the memory to store the exchanged information; and process information stored in a memory of an approaching vehicular entity within the secure area on the basis of an authorization in the exchanged information.

12. The apparatus of claim 11, wherein the secure area comprises a secure channel area around the vehicular entity or a secure communication area around the vehicular entity.

13. The apparatus of claim 11, wherein the memory further stores instructions executable by the processor to cause the processor to:

generate an external private key and an external public key;

provide the external public key to an external communication device of another vehicular entity;

receive data from the external communication device of the other vehicular entity in response to providing the external public key thereto; and decrypt the received data using the external private key.

14. The apparatus of claim 11, wherein the memory further stores instructions executable by the processor to cause the processor to adjust operating parameters of the vehicular entity including a speed and a braking time based on the exchanged information.

15. The apparatus of claim 11, wherein the memory further stores instructions executable by the processor to cause the processor to perform encrypting phases or decrypting phases, or both, on the exchanged information.

16. A method, comprising:

energizing a communication device coupled to a processor of a vehicular entity, wherein the communication device establishes a secure area around the vehicular entity, and the secure area includes a variable area of influence;

exchanging information with other vehicular entities entering the secure area;

processing information stored in a memory of a different vehicular entity within the secure area on the basis of an authorization in the exchanged information; and regulating vehicle parameters of the vehicular entity based on the exchanged information.

17. The method of claim 16, wherein the variable area of influence includes a sphere of influence of the secure area that is extended over at least one parallel lane beyond lane in which the vehicular entity is traveling.

18. The method of claim 16, wherein further information is exchanged with external passive communication components located on borders along a route over which the vehicular entity is traveling.

19. The method of claim 16, further comprising:

adjusting at least a position, a speed, or a braking distance, or any combination thereof, of the vehicular entity, or adjusting a braking time of the different vehicular entity, or both.

20. The method of claim 16, further comprising regulating the vehicle parameters of the vehicular entity by regulating a lane departure involving the vehicular entity.

* * * * *